US009558182B1

(12) United States Patent
Chenon et al.

(10) Patent No.: US 9,558,182 B1
(45) Date of Patent: Jan. 31, 2017

(54) SMART TERMINOLOGY MARKER SYSTEM FOR A LANGUAGE TRANSLATION SYSTEM

(71) Applicant: International Business Machines Corporation, Armonk, NY (US)

(72) Inventors: Christophe D. Chenon, Paris (FR); Marc P. Drapeau, Deux-Montagnes (CA); Francis X. Rojas, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/991,025

(22) Filed: Jan. 8, 2016

(51) Int. Cl.
*G06F 17/20* (2006.01)
*G06F 17/28* (2006.01)
*G06F 17/27* (2006.01)

(52) U.S. Cl.
CPC ....... *G06F 17/2818* (2013.01); *G06F 17/2735* (2013.01); *G06F 17/2845* (2013.01); *G06F 17/2854* (2013.01)

(58) Field of Classification Search
CPC .......................... G06F 17/275; G06F 17/2735; G06F 17/2836; G06F 17/27; G06F 17/2854; G06F 17/2872; G06F 17/21; G06F 17/2827; G06F 17/3043; G06F 17/289; G06F 17/28
(Continued)

(56) References Cited

U.S. PATENT DOCUMENTS 5,535,120 A * 7/1996 Chong ................ G06F 17/2264
704/3
5,587,902 A * 12/1996 Kugimiya ............. G06F 17/218
704/2
(Continued)

FOREIGN PATENT DOCUMENTS

WO 2015029241 A1 3/2015

OTHER PUBLICATIONS

Alejandro Martinez Corria, et al., "Statistical Process Control and Analytics for Translation Supply Chain Operational Management" U.S. Appl. No. 14/741,242, filed Jun. 16, 2015.
(Continued)

*Primary Examiner* — Edgar Guerra-Erazo
(74) *Attorney, Agent, or Firm* — Cantor Colburn LLP; Richard Wilhelm

(57) ABSTRACT

A terminology marker system integrates a terminology analytical component for quantifying the amount of linguistic noise found in the translation output as measured against a dictionary; further, correlating the noise measured on a continuous basis enables the analytical component to build terminology predictive models used in a feedback loop to upstream components of the supply chain to improve future translation of new content. The system also provides a smart terminology assessment component for assessing linguistic assets and improving the quality of those assets to assist in translation. The system also provides a smart terminology evaluation component that is able to analyze MT output to make smart decisions on reducing the amount of post editing corrections needed for delivering a persistent level of translation quality. The integration and configuration of the system component within a translation supply chain assists in delivering a reliable level of translation quality by reducing
(Continued)

ing the linguistic noise across all components of the supply chain.

15 Claims, 17 Drawing Sheets

(58) Field of Classification Search
USPC .......................................................... 704/1–9
See application file for complete search history.

(56) References Cited

U.S. PATENT DOCUMENTS

| | | | | |
|---|---|---|---|---|
| 5,608,622 | A * | 3/1997 | Church | G06F 17/28 704/3 |
| 5,708,829 | A * | 1/1998 | Kadashevich | G06F 17/2795 704/10 |
| 6,389,387 | B1 * | 5/2002 | Poznanski | G06F 17/30737 704/9 |
| 6,493,713 | B1 * | 12/2002 | Kanno | G06F 17/2735 |
| 6,885,985 | B2 * | 4/2005 | Hull | G06F 17/2795 704/1 |
| 6,996,520 | B2 * | 2/2006 | Levin | G06F 17/2735 704/10 |
| 7,209,875 | B2 * | 4/2007 | Quirk | G06F 17/28 704/2 |
| 7,593,844 | B1 * | 9/2009 | Takeshita | G06F 17/2836 704/2 |
| 7,707,025 | B2 * | 4/2010 | Whitelock | G06F 17/2827 704/2 |
| 7,765,098 | B2 * | 7/2010 | Bradford | G06F 17/2809 704/2 |
| 8,145,472 | B2 * | 3/2012 | Shore | G06F 17/2836 704/2 |
| 8,266,169 | B2 * | 9/2012 | Bobrow | G06F 17/2775 707/759 |
| 8,548,791 | B2 * | 10/2013 | Itagaki | G06F 17/2818 704/2 |
| 8,700,383 | B2 * | 4/2014 | Sneddon | G06F 17/289 704/2 |
| 9,189,475 | B2 * | 11/2015 | Shri | G06F 17/271 |
| 9,201,869 | B2 * | 12/2015 | Ogren | G06F 17/28 |
| 2002/0111789 | A1 * | 8/2002 | Hull | G06F 17/2795 704/4 |
| 2004/0102201 | A1 | 5/2004 | Levin | |
| 2005/0102130 | A1 * | 5/2005 | Quirk | G06F 17/28 704/4 |
| 2006/0004560 | A1 * | 1/2006 | Whitelock | G06F 17/2827 704/2 |
| 2009/0055358 | A1 * | 2/2009 | Tomasic | G06F 17/30613 |
| 2010/0161639 | A1 * | 6/2010 | Bobrow | G06F 17/2775 707/759 |
| 2011/0184722 | A1 * | 7/2011 | Sneddon | G06F 17/289 704/7 |
| 2012/0316862 | A1 | 12/2012 | Sultan et al. | |

OTHER PUBLICATIONS

Alejandro Martinez Corria, et al.,"Measuring Linguistic Markers and Linguisic Noise of a Machine Human Translation Supply Chain", U.S. Appl. No. 14/319,863, filed Jun. 30, 2014.
Christophe D.A. Chenon, et al.,"Translation Validation" U.S. Appl. No. 14/246,861, filed Apr. 7, 2014.
M. Vasconcellos, et al.,"Terminology and Machine Translation", Handbook for Terminology Management, vol. 2, 2001, p. 1-8.
M. Vela et al., "Predicting Machine Translation Adequacy with Document Embeddings", Proceedings of the Tenth Workshop on Statistical Machine Translation, Sep. 17-18, 2015, p. 1-9.
O. Craciunescu, et al.,"Machine Translation and Computer-Assisted Translation:a New Way of Translating?", Translation Journal and the Author, vol. 8, No. 3, Jul. 2004, p. 1-11.
T. Mikolov, et al.,"Exploiting Similarities among Languages for Machine Translation", arXiv,vol. 4, Sep. 17, 2013, pp. 1-10.
White pages,"Three Quick Tips for Improving MT Quality", KantanMT.com, Technical Support, 2013-2015, p. 1-2.

* cited by examiner

| | TermIndex | | |
|---|---|---|---|
| MT:MetricScore | <0.33 | <=0.80 | >0.80 |
| < LOW THRESHOLD | FULL PE | FULL PE | LITE PE |
| < GIST THRESHOLD | FULL PE | LITE PE | GIST |
| < FLUENT THRESHOLD | LITE PE | GIST | PassThru |

SMART TERMINOLOGY MARKER SYSTEM FOR A LANGUAGE TRANSLATION SYSTEM

BACKGROUND

The present disclosure relates to language translation systems and more particularly to a smart terminology marker system of the language translation system.

Companies typically develop written material such as web pages, user interfaces, marketing materials and others in a native language and subsequently employ a language translation service to translate the company's web pages (as one example) into different languages. Language translation services may utilize a translation supply chain (TSC) that may include an integration of linguistic assets/corpuses, translation automated systems, computer-aided translation editors, professional linguists, and operational management systems.

The TSC may include three stages. The first stage may be a linguistic asset optimization stage that may parse source language content into source segments, and search a repository of historical linguistic assets for the best suggested translations per language and per a domain within the language. Linguistic assets may be historical translation memories (i.e., bi-lingual segment databases), dictionaries, and/or language specific metadata to optimize downstream stages. The second stage of the TSC may be a machine translation stage that customizes a translation model using domain specific linguistic assets of a given language, and provides machine generated suggested translations of original content based upon the customized translation model. The third stage may be a post-editing stage that may use a computer-aided translation (CAT) editor to review the suggested translations (i.e., called matches) to produce a final translation. The professional linguist (i.e., human) may accept one of the suggested matching translations, may modify one of the suggested matching translations, or may generate a completely new translation and delivers final human fluent translated content to the company.

Machine translation systems typically implement phased-based translations that have limited sensitivity to morphological, syntactical and/or semantic differences between the source and target languages. The process of customizing (i.e., training) a phased-based statistical machine translation system is common where bilingual corpuses are used to prioritize the statistical hits of correct translations within the statistical machine translation, phased-based, translation. Rule based machine translation is customized by managing a lexicon of terms aligned to a subject area. Terminology assets refer to the set of dictionaries/databases per language that may have the following properties: highly structured information; morphological, syntactical, and semantic information; and, enterprise international business metadata. Improvements in the overall quality of the translations on a consistent basis is desirable.

SUMMARY

In accordance with an embodiment, a computer implemented method is provided in which a Smart Term Assessment subsystem (STA-SS) embeds a Smart Term Index marker within a plurality of segments (i.e., previous learning corpuses and/or new content) based on a reference domain dictionary; the Smart Term Index markers may improve the training and optimization of downstream components (e.g., MT), thus producing better translations.

In accordance with an embodiment, a computer implemented method is provided in which a Smart Term Evaluation subsystem (STE-SS) analyzes the embedded Smart Term Index markers contained across a plurality of matches (potential language translations) against the reference domain dictionary and the terminology predictive models to filter and qualify the matches (i.e., the STE-SS may remove matches deemed to be of poor quality).

In accordance with an embodiment, a computer implemented method is provided in which a Smart Term Linguistic Analytical subsystem (STLA-SS) analyzes using a plurality of post editing logs (PE logs) to generate a match dictionary that can be correlated with the original reference domain dictionary and final (post PE) dictionary.

In one embodiment the STLA-SS provides methods for
a) generating a Best Term Index (BTI) by using the plurality of best matches across the plurality of source and target language segments and the respective final dictionary,
b) generating a Perfect Term Index (PTI) by using a plurality of final translations across the plurality of source and target language segments and the respective final dictionaries,
c) generating a Final Term Index (FTI) by using the plurality of final translations across the plurality of source and target language segments and using the respective original reference dictionaries,
d) generating a Machine Term Index (MTI) by using the plurality of best matches across the plurality of source and target language segments and using respective match dictionaries,
e) generating a Final Match Term Index (FMTI) by using the plurality of final translations across the plurality of source and target language segments and using the respective match dictionaries, and
f) generating a plurality of terminology predictive models by analyzing the patterns and correlations between the dictionary terms and the computed terminology indexes (BTI, PTI, FTI, MTI and FMTI).

In accordance with another embodiment, a computer implemented method for translating a language includes parsing source and target language content into segments, searching a repository of linguistic assets, creating a translation model using domain specific linguistic assets of the language, providing machine generated suggested matches of the source and target language segments based upon the customized translation model, using a computer-aided translation editor to review the suggested matches to produce a final translation, and applying smart terminology markers generated by a smart terminology marker system to reduce linguistic noise.

In accordance with a further embodiment, a computer program product for language translation applications may include a translation supply chain and a smart terminology marker system. The translation supply chain includes an asset optimization (i.e., translation memory) component configured to parse source language content into a plurality of source segments and searches a repository of historical linguistic assets. The asset optimization component produces a plurality of matches classified into any one of Exact match, Fuzzy match or other matches. A machine translation (MT) component configured to deliver a plurality of machine matches corresponding to the plurality of source segments optimized against a custom domain MT model. A post editing component configured to correct and produce the final translation segments against the respective source segments by utilizing human professional linguists editing and correcting with any given embodiment of a computer aided translation editor. The smarter terminology marker system is configured to use at least one of business analytics and terminology memory mining to reduce linguistic noise across the translation supply chain.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 10 is a table illustrating an exemplary embodiment of a PE routing decision table to be used by a smart term evaluation subsystem of the smart terminology marker system;

DETAILED DESCRIPTION

Figure 1:
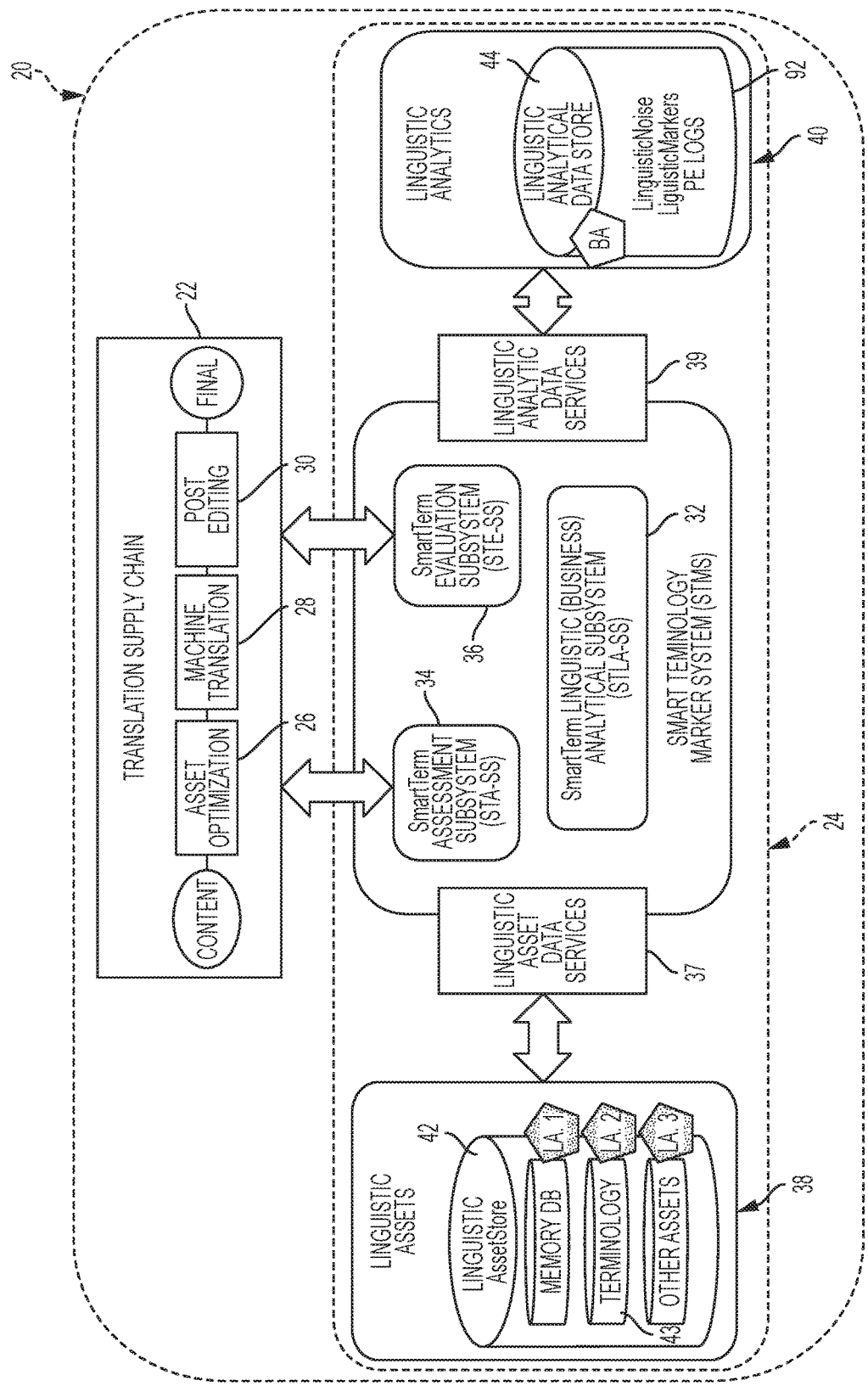
FIG. 1 depicts a language translation system that includes a translation supply chain and a smart terminology marker system as one exemplary embodiment of the present disclosure.

In accordance with exemplary embodiments of the disclosure, methods, systems and computer program products for a language translation system 20 are provided. Referring to FIG. 1, the language translation system 20 includes a translation supply chain (TSC) 22 and a smart terminology marker system (STMS) 24 configured to assist the TSC 22 by reducing linguistic noise. The TSC 22 may span multiple companies and/or components connected over a network executing a translation workflow that may import a package containing a plurality of source content objects and delivering an output package that may contain a translated content for the same plurality of source content objects.

In the present disclosure, terminology assets applied via a feedback loop across the TSC 22 by the STMS 24 functions to reduce linguistic noise and may improve the overall quality of the translations on a consistent basis. More specifically, the use of smart terminology markers may identify and assist in eliminating hidden linguistic noise (i.e., terminology noise) found in the translation assets (e.g., translation memory/bilingual corpus assets) during customization. By quantifying the terminology noise found in source segments and the plurality of potential target matches, the systems and methods outlined, herein, may allow an operational team to improve the creation of terminology-enriched training materials. It is understood that the term "linguistic noise" is a measurable unit corresponding to the human labor expended (i.e., mechanical and/or cognitive effort) to correct faults in translation memory and/or machine translation matches such that the final translated content is of human fluency quality levels. By utilizing the STMS 24, operational teams are able to manage and optimize the terms used within the dictionaries, thereby reducing linguistic noise and improving efficiency of the TSC 22.

Translation Supply Chain:

In one embodiment, the TSC 22 facilitates translation workflows that may be used in the delivery of high quality fluent language translations. The TSC 22 may include a translation memory (TM) component 26, a machine translation (MT) component 28, and a post editing (PE) component 30. It is understood that use of the term 'component' may infer a stage of a process and/or method that may utilize computer-based processor(s) and associated computer readable memory to accomplish a given task.

The TM component 26 may also be referred to as a linguistic asset optimization component or stage that may parse source language content into source segments, and search a repository of historical linguistic assets for the best suggested translations per language and per a domain within the language. Linguistic assets may be historical translation memories (i.e., bi-lingual segment databases), dictionaries, and/or language specific metadata used to optimize downstream components 28, 30. More specifically, the TM component 26 may manage the delivery of high quality/domain specific linguistic assets optimized for the downstream components 28, 30. The assets may include: a plurality of high quality and certified previously translated translation memory matches that aid the human professional linguist in making corrections more efficiently in the PE component 30; a plurality of 'learning translation memory' datasets containing a plurality of previously translated bilingual segments that are used to train and tune the MT component 28 (i.e., services); and, a terminology database (DB) (i.e., Language Dictionary) for a given domain.

The translation memory component 26 may generally be any system and/or method involved in the production of potential translation matches (e.g., Exact matches, Fuzzy matches and/or other matches) corresponding to the plurality of new content source segments used to improve the efficiency of downstream components (e.g., MT component 28). The translation memory component 26 may use the plurality of previously translated segments and/or dictionaries for a given language as an 'asset optimization' for downstream components. It is understood that the term 'segment' may mean a plurality of words or terms that may, for example, be a sentence or a partial sentence.

The MT component 28 may deliver a plurality of machine matches corresponding to the plurality of new content source segments optimized against a custom domain machine translation service. The MT component 28 may integrate an increasing number of linguistic subcomponents. For instance, an MT component 28 building custom domain MT models may be dependent on the quality of the linguistic asset data service 38 used as input to the customization components for a specific domain (i.e., subject discourse).

Figure 2:
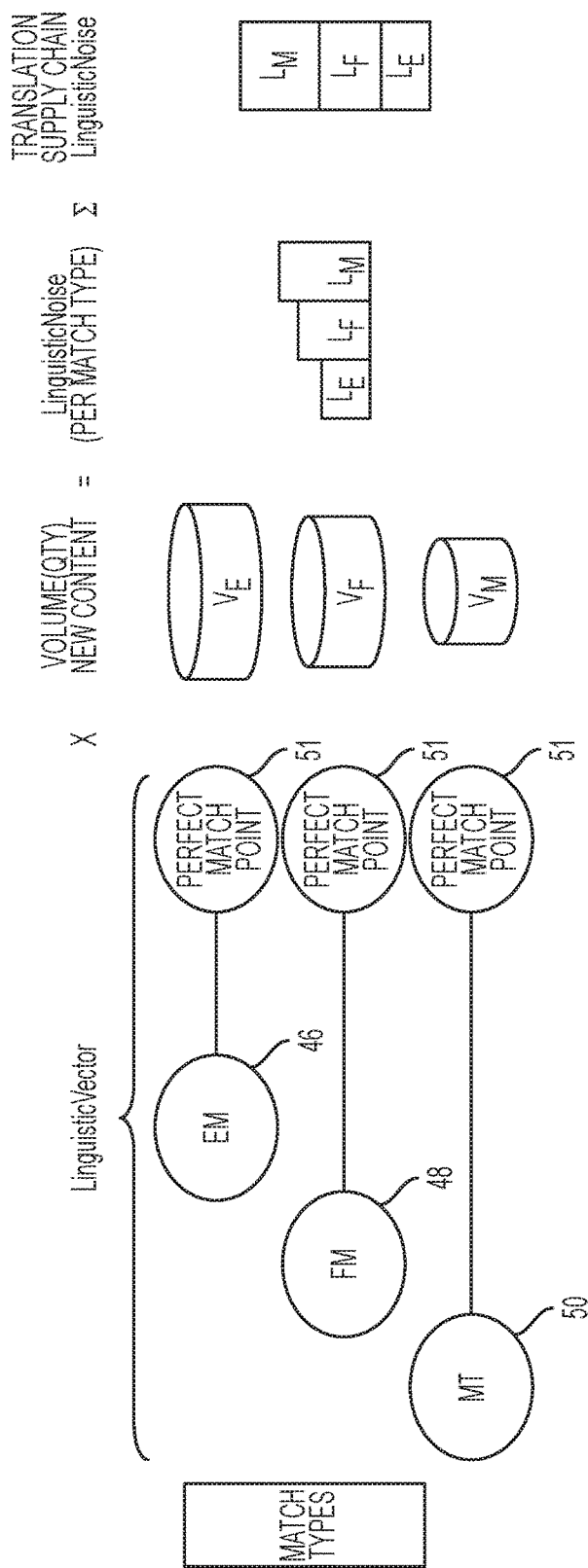
FIG. 2 depicts a simplified embodiment of linguistic noise and its relation to a set of linguistic vectors per matchtype applied by the Smart Terminology Marker System (STMS)

The PE component 30 may utilize human professional linguists to review, correct, and perform quality control on the new content source segments and the respective matches (e.g., Exact Match 46, Fuzzy Match 48 and/or Machine Match 50, see FIG. 2), so that the final plurality of translated segments meets the expected quality service level. The services may use a computer-aided translation editor that integrates increasing machine-human interface components (i.e., assistants), thereby assisting the human professional linguist to become highly efficient without a reduction in the quality of final translated content.

Linguistic Assets:

Linguistic assets may be any data set considered to be representative of the space, domain or subject matter existing 'prior' to the translation of new language content. Typically, linguistic assets may be bi-lingual pairs of historical translations contained within a data set that may be called a translation memory (i.e., at a segment and/or sentence granularity) and/or a Dictionary (i.e., at a word/term or simple phrase granularity).

When applying linguistic assets, new language content may be broken down into segments with the goal of producing a translation per segment of optimal accuracy and with no post editing. The production of suggested translation candidates may be referred to as matches. Referring to FIG. 2 as an exemplary embodiment, linguistic assets may be divided into about three match types. A first type may be Exact Matches 46 where the new content source segment is associated with the exact same context, space and/or subject matter. A second type may be Fuzzy Matches 48 where the new content source segment is associated with one or more similar context, space and/or subject matter or within the same major domain space. For example, matches containing 'databases' or 'hard drives' may be considered similar within the information technology domain. A third type may be Machine Matches 50 produced by the MT component 28 implementing some level of machine learning and/or automation.

The value or quality of linguistic assets may generally be measured by the quantity of linguistic noise. The language translation system 20 may include or implement techniques of statistical process analytic and control that analyze metadata supplied from the TM component 26, the MT component 28 and/or the PE component 30. By analyzing the metadata from the PE component 30 logs (i.e., at the end of the TSC 22 flow), the operational analytical systems are able to provide visualization and model the efficiency of the downstream components across the whole TSC 22.

Figure 9:
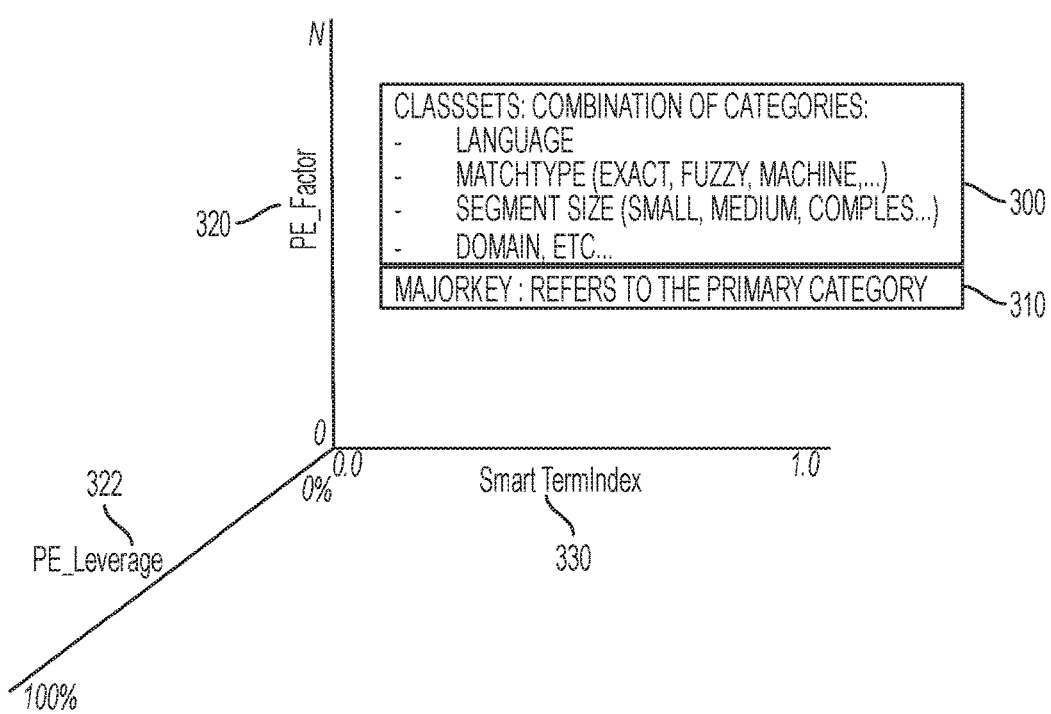
FIG. 9 depicts an exemplary three-dimensional graph depicting linguistic markers plotted with the Smart Term Index assigned to the x-axis.

Linguistic Vectors and Linguistic Noise Per Classset:

Referring to FIG. 9, when the human professional linguist selects about one hundred percent of the matches, the matches are measured by the STLA-SS and reflected as a PE_Leverage 322 having a value of 1.0. And, when the human professional linguist performs no work on correcting the same set of matches, then this is measured by the STLA-SS and reflected as a PE_Factor 320 with a value of zero. When the STLA-SS measures the PE_Leverage equal to 1.0 and the PE_Factor equal to 0.0 then this is referred to as a perfect match point 51 reflecting a perfectly optimized TSC 22. The linguistic matches 46, 48, 50 (see FIG. 2) may be a numeric value composed of multi-dimensional metrics collected from the metadata across various components 26, 28, 30 of the TSC 22. As best shown in FIG. 2, a simplified example is illustrated as a two-dimensional coordinate system tracking all shipments by 'selection average' and 'work effort' measured during the PE component 30. It is understood that the linguistic noise coordinate system is based on a multi-dimensional space that may measure up to 'N' different marker dimensions. For the purpose of brevity this disclosure uses two and three dimensional illustrations.

For each shipment, the STLA-SS 32 analyzes the plurality of metadata metrics across the plurality of editing events collected within the shipment's PE_Log 92 (see FIG. 8) to assess the linguistic marker value for each new content source segment. The STLA-SS then aggregates all the event data across a plurality of classsets 300 (i.e., combination of metadata metrics). Examples may include: matchtype [Exact Match, Fuzzy Match, Machine Match], size of segment [small, medium, complex], domains [$D_1, D_2, \ldots, D_n$], and/or languages [$L_1, L_2, \ldots, L_n$].

The STLA-SS analysis is able to plot each classset by the Smart Term Index against one or more other metrics onto a coordinate system.

Referring to FIG. 9, an exemplary embodiment of a three dimensional coordinate system (Smart Term Index, PE_Factor, PE_Leverage) is illustrated. In this embodiment, the Perfect Match Point is represented by the point (1.0, 0.0, 1.0). The STLA-SS system and methods may then compute the linguistic vector (i.e., the distance from the classset marker coordinates to the perfect match points 51 (see FIG. 6). The linguistic vector is the value of this distance from the classset marker point to the perfect match point 51. The linguistic vector per classset can be said to represent a measurement noise for a single classset of a single shipment. The linguistic noise is a value computed by multiplying the volume (i.e., quantity) of words for each classset by the linguistic vector of the respective classset. The linguistic noise value reflects both observed and hidden causes (variables) contributing to the cumulative TSC linguistic noise. The STLA-SS then computes the linguistic noise value for the whole shipment by summing the linguistic noise of all classsets for the respective shipment.

There are many factors (observed and hidden) that may contribute toward linguistic noise, and such elements may include: quality of content, consistency of terminology, complexity of subject area, format of original content, tags and in-line tags, MT 28 settings, language specific algorithms and rules, post editing practices, human errors, computer aided translation skills, cultural and domain knowledge, spending too much time evaluating bad MT matches, and others. Each component 26, 28, 30 may supply input markers metadata for correlating and analyzing against linguistic markers and thereby assess and model its contribution of linguistic noise to the overall TSC 22 linguistic noise.

Smart Terminology Marker System:

Referring to FIG. 1, the STMS 24 of the language translation system 20 and associated methods may be used for managing and optimizing the TSC 22 using business analytics and/or terminology memory mining with specific focus on minimizing linguistic noise across the TSC 22. The STMS 24 may include a smart term linguistic analytical subsystem (STLA-SS) 32 (i.e., business), a smart term assessment subsystem (STA-SS) 34, a smart term evaluation subsystem (STE-SS) 36, a linguistic asset data service 37 and a linguistic analytics data service 39 (i.e., business linguistics). The linguistic asset data service 37 may include a linguistic asset store component 42 configured to store historical language assets. The linguistic analytics data service 39 may include a linguistic analytic data store component 44 configured to store linguistic analytical data (e.g., PE logs 92).

The linguistic asset store 42 of the linguistic asset component 38 may store a Language Dictionary 43 (ie. terminology store) as a linguistic asset for use by any component 26, 28, 30 of the TSC 22. The Language Dictionary 43 may generally be a plurality of words associated with a single language. The smart terminology marker system 24 may use business analytics to add translation supply chain analytical metadata to each term (i.e., word). Such metadata may contain, but is not limited to: frequency of each term within the TM component 26; the classification of whether the term is a non-prescribed word within the language; and the average linguistic noise associated with the plurality of translation segments containing the respective term. This may be a rolling measurement representative of translations over a previous period of time.

The linguistic asset store component 42 may store a Reference Domain Dictionary 52 accessible by any component (e.g., components 26, 28, 30) of the TSC 22. The Domain Dictionary may generally be a plurality of words for a given language associated with a specific subject area, discourse or discipline. The plurality of terms within the Domain Dictionary is a subset of the plurality within the Language Dictionary. The union of all Domain Dictionaries within the TSC 22 composes the significant set of terms in the Language Dictionary. The STMS 24 may store additional information about each term such as, but not limited to: the frequency of each term across all domain assets within the asset optimization component 26; the classification of whether the term is a non-prescribed word for the specific domain within the language; and, the average linguistic noise associated with the plurality of translation segments containing the respective term. This may be a measurement that is updated as new translations are performed over a period of time. Such information per term may be referred to as the term's metadata.

Figure 3:
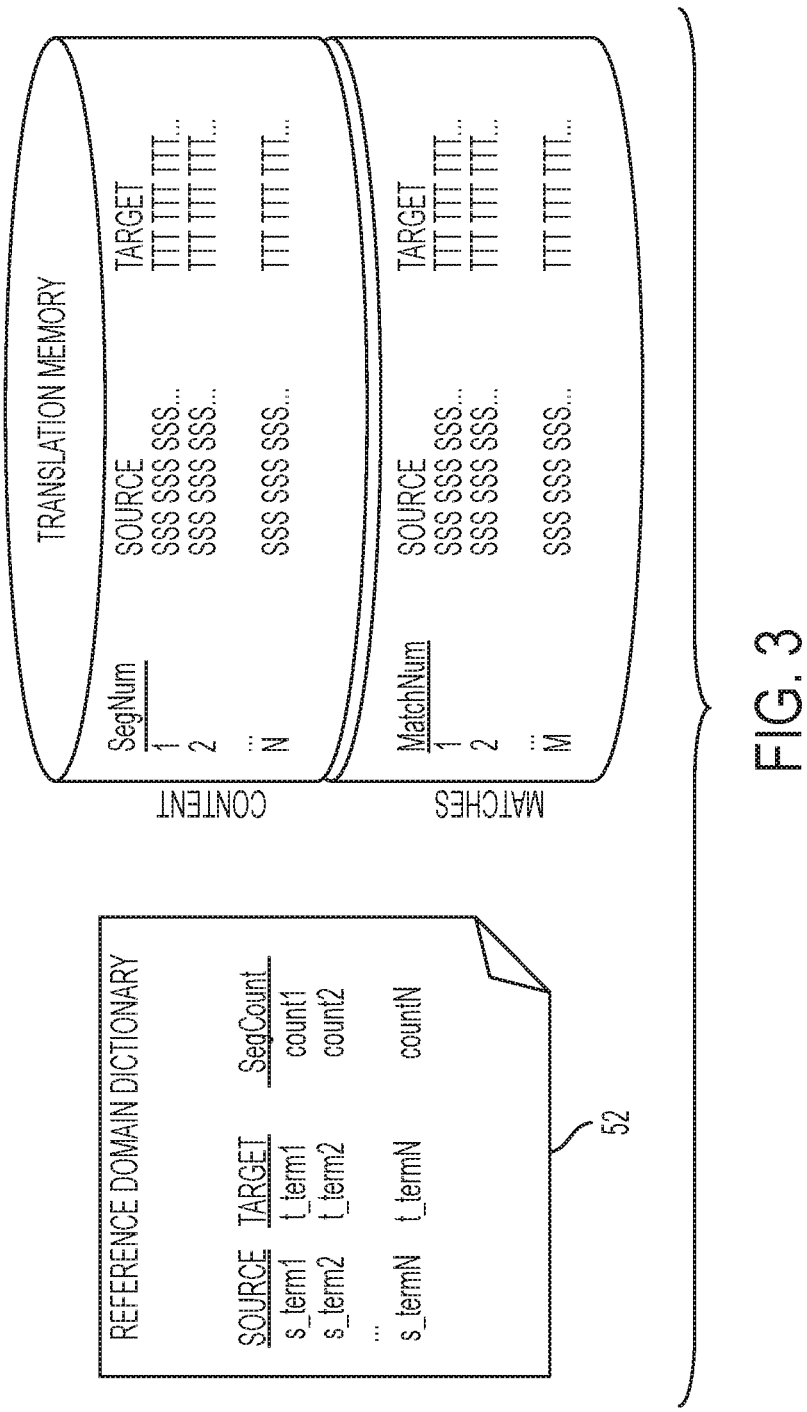
FIG. 3 depicts an exemplary embodiment of a Reference Domain Dictionary and an exemplary embodiment of a translation memory store.

Referring to FIG. 3, a Reference Domain Dictionary 52 is a store of existing source terms (s_termX) associated with a single domain, the respective target term (t_termX) for each source term for a given language and the metadata associated with each source term. A Reference Domain Dictionary 52 is created for the life of a specific task within the TSC 22. The purpose of the Reference Domain Dictionary 52 is to reflect the dynamic changes and usages of languages for a variety of translation service requests over a range of domains. An instance of a Reference Domain Dictionary 52 may be associated with a single source language and a single target language. Access to the Reference Domain Dictionary 52 may be made through the linguistic asset data service 37. Referring to FIG. 3, an exemplary translation memory store is illustrated. The translation memory store may contain the following two parts: a) new content segments and b) matches. The new content segments may contain a plurality of segments with each segment identified by a segment ID of one to 'N'. Each new content segment may have a source string "SSS . . . " and may initially have no target string "TTT . . . ". Once PE is complete, the target string "TTT . . . " is committed as meeting the quality service levels. The matches may contain a plurality of matches where each match is identified by a segment ID of one to 'N'. Each match has a source string "SSS . . . " and has a target string "TTT . . . " produced by a human post editing and correction.

Smart Term Index:

Consistent terminology may be a key driver of quality translation across the whole TSC 22. Given a plurality of language dictionaries and a plurality of domains dictionaries per language the operational team of a TSC 22 needs the ability to visualize and track the linguistic noise in the management of the dictionaries of a TSC 22. Thus the STMS 24 introduces a Smart Term Index value that is used to measure the alignment between a plurality of segments and/or matches with the Reference Domain Dictionary 52.

The STMS 24 defines the systems and methods computing a "Smart Term Index" value on a per segment/match level and embedding within translation memories as a linguistic marker such that the marker passes thru the TSC 22 and can then be analyzed by the STLA-SS 32 to measure the linguistic noise contributed from misaligned terminology across the TSC 22.

Figure 4:
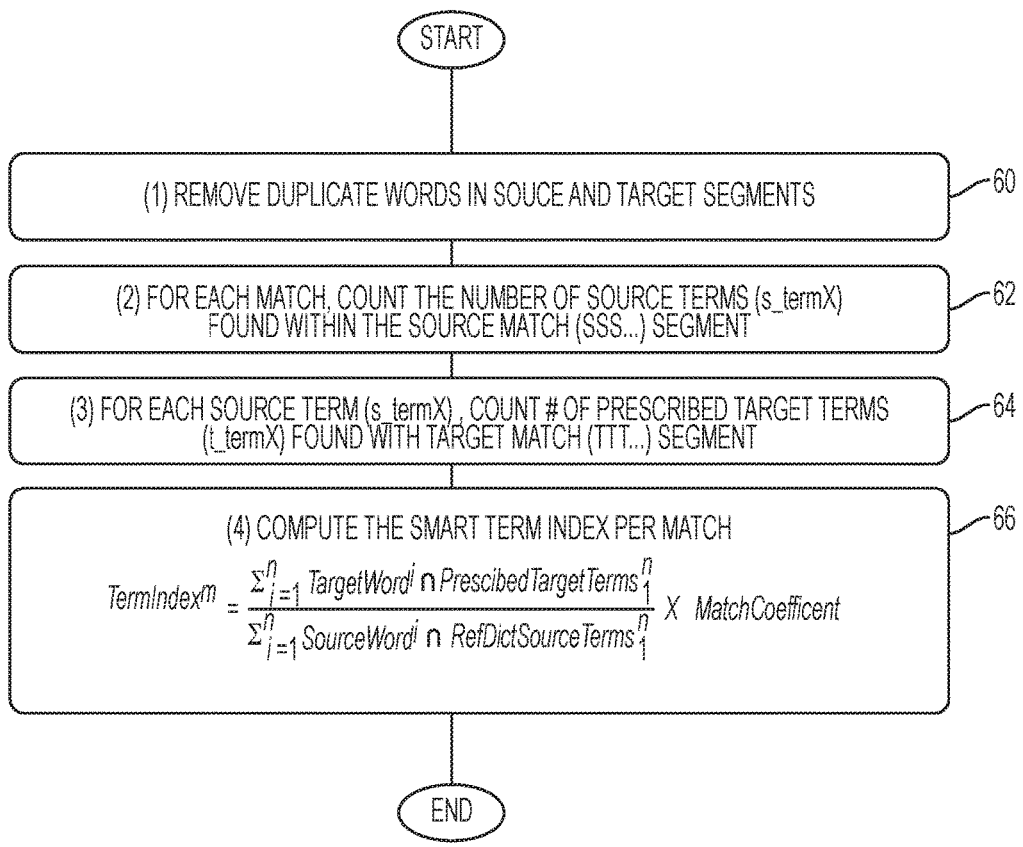
FIG. 4 is a flow chart illustrating an exemplary method of computing the Smart Term Index.

Referring to FIG. 4, one embodiment for computing the Smart Term Index for a given segment and/or match within a translation memory against a given Reference Domain Dictionary 52 is illustrated. The first step 60 is to remove duplicate words in source and target language segments/matches. As step 62, for each bi-lingual match, count the number of source terms found within the source match segment. As step 64, for each source term found, count the number of prescribed target terms found within the target match segment. As step 66, computes the Smart Term Index per match using the following equation (1):

$$TermIndex^m = \frac{\sum_{i=1}^{n} TargetWord^i \cap PrescribedTargetTerms_1^n}{\sum_{i=1}^{n} SourceWord^i \cap RefDictSourceTerms_1^n} \times MatchCoefficient \quad (1)$$

where 'm' is a given match, 'RefDictSourceTerms' is the plurality of terms in the Reference Domain Dictionary, PrescribedTargetTerms' represents the plurality of prescribed target terms of a given match within the Reference Domain Dictionary 52 associated with respective source terms that are found in the Reference Domain Dictionary 52, and 'MatchCoefficient' is a numerical value between zero and one that is used to weight a specific 'TermIndex$^m$' based on external factors. In one embodiment, the 'MatchCoefficient' may be the Levenstein Edit Distance between a match source string and the respective original source segment that may be called the fuzzy score.

Each match may be assigned a 'Term_INDEX1' range from 0.0 to 1.0. A score of 1.0 means that one-hundred percent of the prescribed target translations were found in a match. A score of 0.0 means that none of the prescribed target translations were found in the match.

Figure 5:
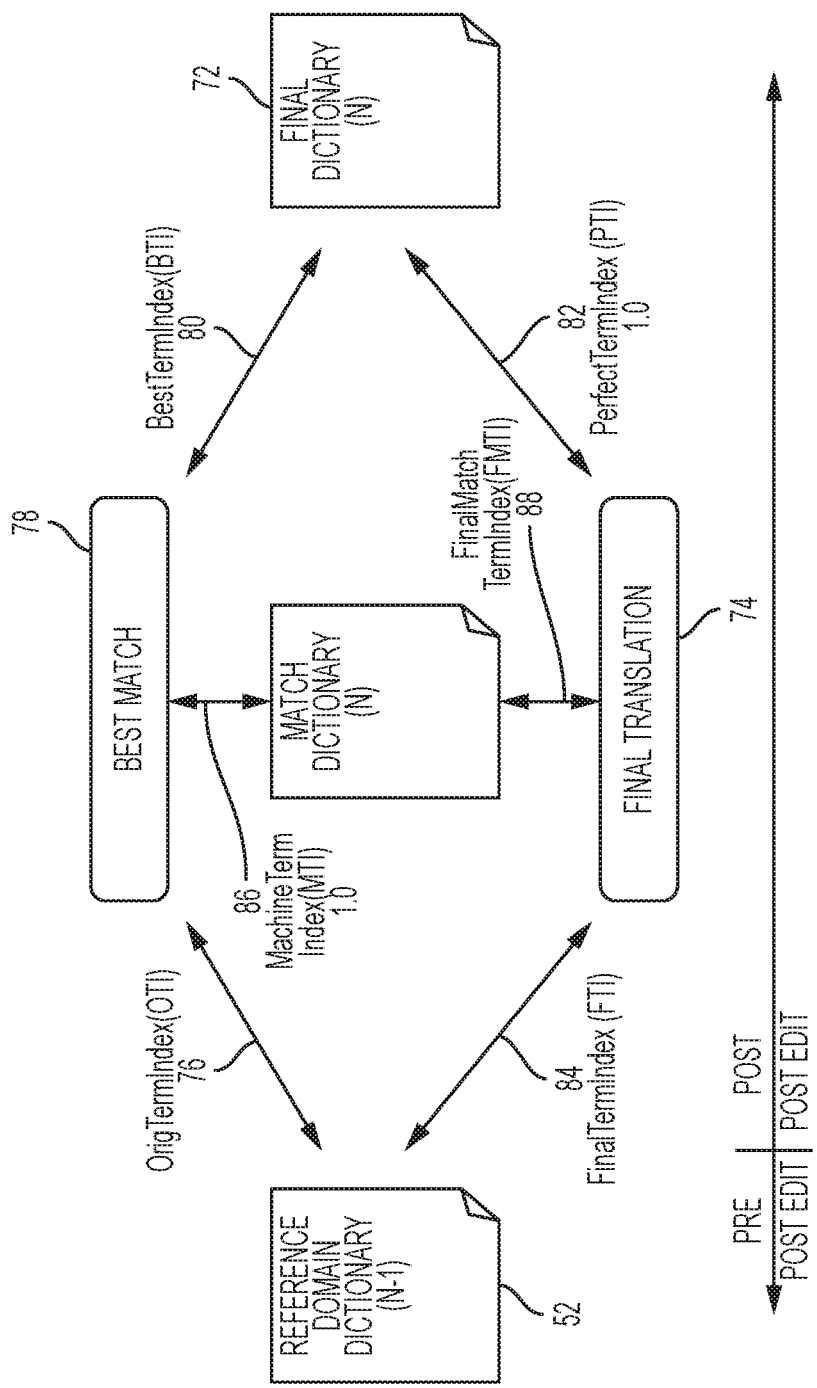
FIG. 5 depicts a Reference Domain Dictionary provided before post editing, a Final Dictionary produced at the completion of post editing, an illustration of the set of matches accepted by the human professional linguist ('Best Match'), along with the final translated segments ('Final Translation') produced during post editing (PE)

Referring to FIG. 5, various linguistic markers may be computed for a given plurality of matches associated with a given Reference Domain Dictionary 52 as well as a Final Dictionary. A Match Dictionary 70 is a plurality of unique terms found in the plurality of all matches for a given shipment. A Final Dictionary 72 is a plurality of unique terms found in the plurality of final translations 74 for a given shipment. An Original Term Index (OTI) 76 presents the Smart Term Index generated by the STLA-SS 32 using a plurality of best matches 78 across the plurality of segments and the respective Reference Domain Dictionary 52. A Best Term Index (BTI) 80 represents the term index generated by the STLA-SS 32 using the plurality of best matches 78 across the plurality of segments and the respective Final Dictionary 72. A Perfect Term Index (PTI) 82 represents the term index generated by the STLA-SS 32 using the plurality of final translations 74 across a plurality of segments and using the respective Final Dictionary 72. This score is always about one. A Final Term Index (FTI) 84 represents the term index generated by the STLA-SS 32 using the plurality of final translations 74 across a plurality of segments and using the respective Reference Domain Dictionary 52. A Match Term Index (MTI) 86 represents the term index generated by the STLA-SS 32 using a plurality of best matches 78 across a plurality of segments and using the respective match dictionary 70. A Final Match Term Index (FMTI) 88 represents the term index generated by the STLA-SS using a plurality of final translations 74 across a plurality of segments and using the respective Match Dictionary 70.

Figure 6:
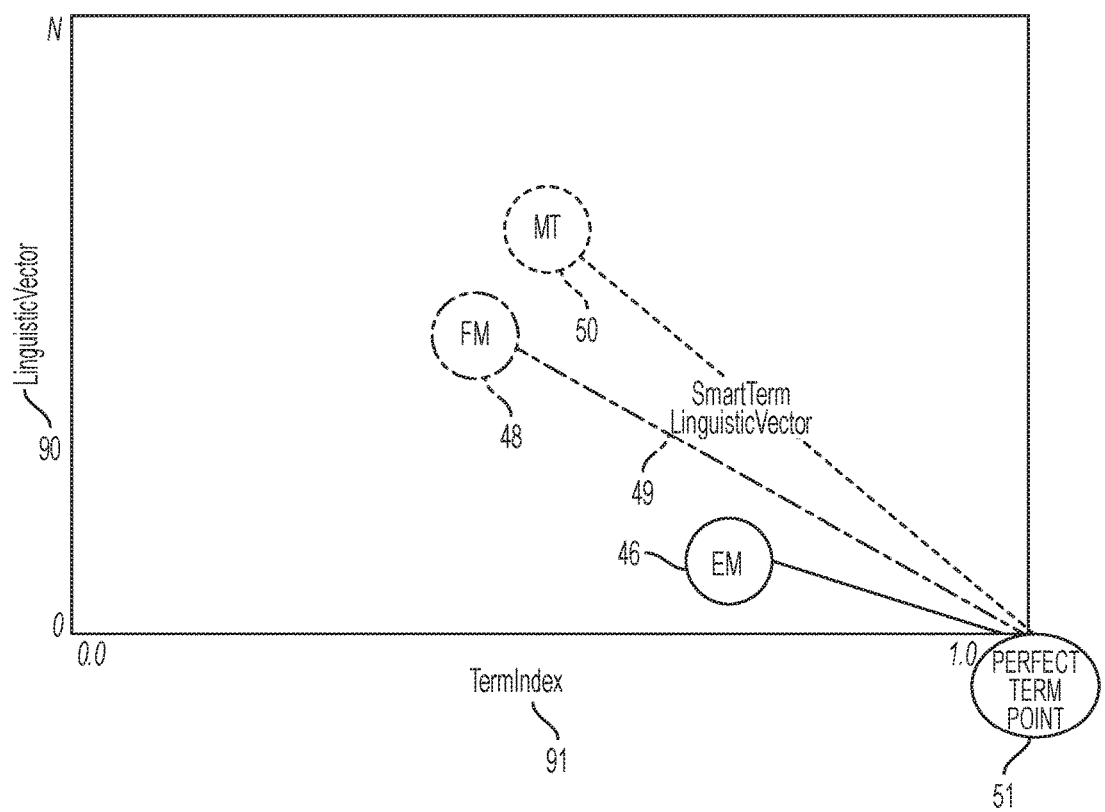
FIG. 6 is a graph illustrating a Smart Term linguistic vector calculated and applied by a smart term assessment subsystem (STA-SS)

Smart Term Linguistic Vector:

Referring to FIG. 6, an exemplary two dimensional graph plots three linguistic marker value points associated with a plurality of Matchtype classsets 300. The three value points may be an Exact match classset 46, a Fuzzy match classset 48 and a Machine match classset 50. Each classset represents a plurality of PE editing events associated with a respective new content source segments. In one embodiment, the Y-axis represents a given linguistic vector 90 with a value range of zero to 'N' computed by using the respective PE_Leverage and PE_Factor values for each respective classset; in a another embodiment the linguistic vector 90 may be computed using additional metrics. In one embodiment the X-axis represents a Smart Term Index 330 with a value range of 0.0 to 1.0 computed for each respective classset.

FIG. 6 illustrates the Exact match classset 46 linguistic marker having a Smart Term Index closest to the Perfect Match Point (PMP) 51 reflecting that the terminology is well aligned with the Reference Domain Dictionary 52. Further, the MT match classset 50 reflects that the Smart Term Index is better than the FM match classset 48 indicating that the terminology within the MT model is better than the set of Fuzzy matches. Yet, the distance of the SmartTerm linguistic vector for the MT match classset 50 is greater than the distance of the Fuzzy match classset 48 indicating that more labor was needed in correcting the MT matches. Given such a pattern, the TSC 22 operational team should isolate the set of events causing the increased corrective efforts and assess to what degree the terminology alignment contributed to the corrections. This demonstrates how the Smart Term Index, in combination with other linguistic index metrics, enables the STMS 24 to isolate terminology issues within the TSC 22.

Given a TSC 22 managing multiple dimensions (i.e., variables) the STLA-SS 32 enables a translation operational team to use Smart Term Index markers for reducing the smart term linguistic vector for a plurality of segments associated within a given classset, and building a statistical model(s) that enables the STE-SS 36 to predict the minimal FTI given a plurality of OTI for a given classset.

Figure 7:
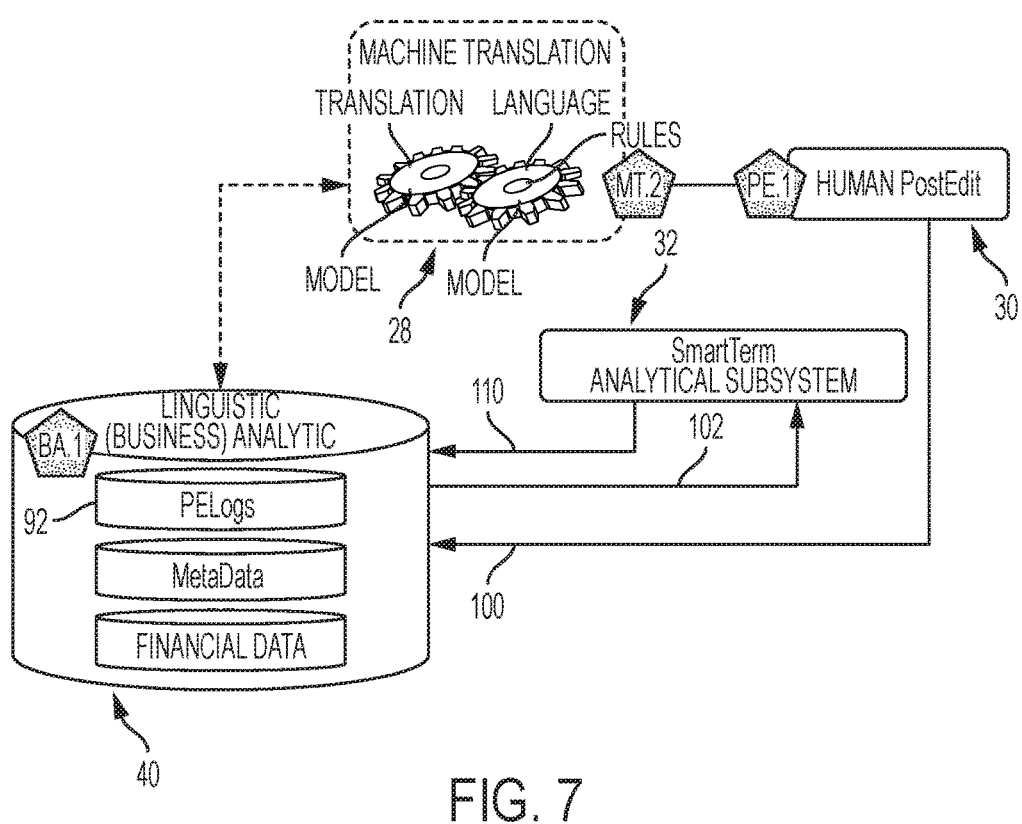
FIG. 7 depicts an exemplary method of operation of a smart term linguistic analytical subsystem (STLA-SS) of the smart terminology marker system.
Figure 8:
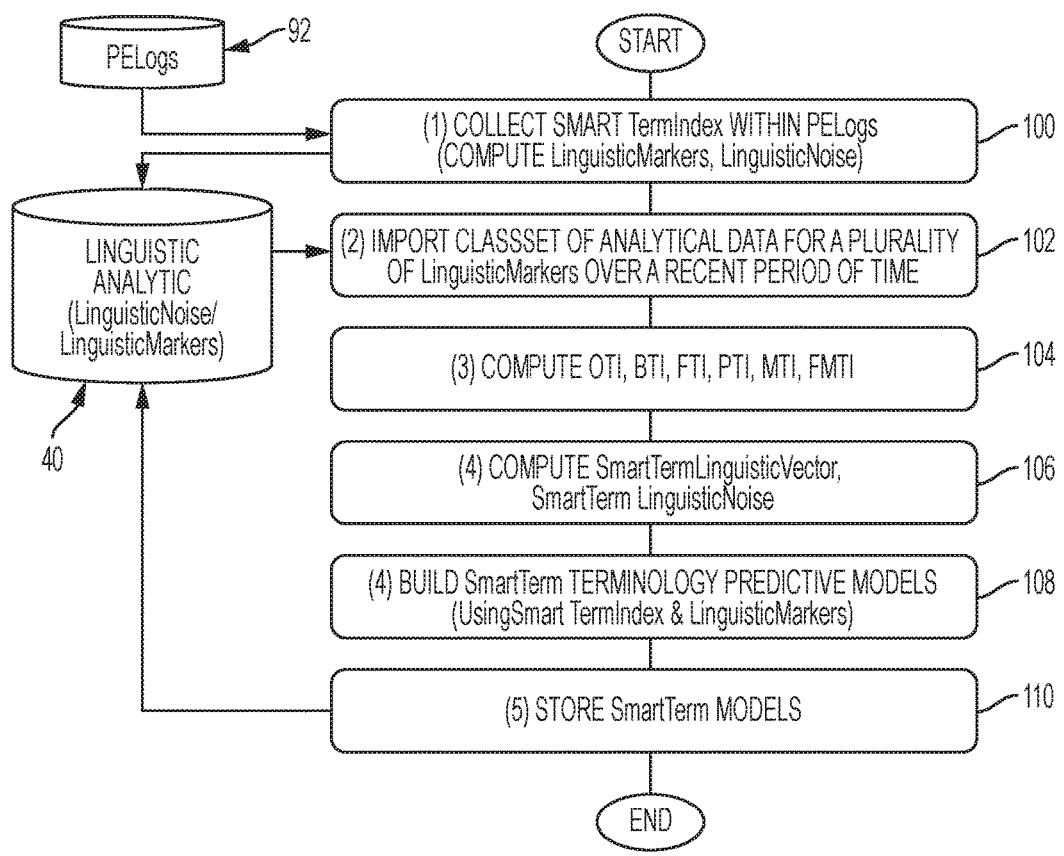
FIG. 8 is a flow chart illustrating a smart term linguistic analytical subsystem linguistic analysis on smart term markers.

Smart Term Linguistic Analytic Subsystem:

Referring to FIGS. 7 and 8, the STLA-SS 32 may correlate and analyze Smart Term Index against a plurality of other metrics within the plurality of events within the PE logs 92 to aid the TSC 22 operational teams, reduce linguistic noise across the components 26, 28, 30, and assets. Specifically, the STLA-SS 32 provides operational teams with methods to quantify the following:

The smart term linguistic vector as a representation of noise caused by terminology changes from a Reference Domain Dictionary 52.

Measure the amount of linguistic noise attributed from a plurality of Smart Term Index markers passed from downstream linguistic components.

Assess and weight the importance of terms for a given Reference Domain Dictionary across a plurality of shipments within a TSC 22.

Create smart term models and identify patterns for Smart Term Index for a plurality of Reference Domain Dictionaries.

Enable predictive analytics to alert when linguistic asset (memories/termDB) are no longer aligned with a Final Dictionary (terminology changes) relative to a Reference Domain Dictionary indicating when action is needed to harmonize the two.

The smart term evaluation subsystem 36 may perform the various tasks illustrated in FIG. 8.

The STLA-SS 32 uses the Linguistic Analytic Business Data Services (LABA) 39 to retrieve PE log 92 event data. The PE logs 92 supports aggregating events across a Majorkey 330 of a multi category classset 300. The Majorkey 330 category may be languages, shipments (per language), documents (per shipment), or segments (per document), term domain or any other dimension.

Referring to FIG. 8, the STLA-SS 32 linguistic analysis process relative to Smart Term Markers may generally start with step 100 associated with the collection of a Smart Term Index with the PE log(s) 92 of the linguistic analytical data store component 44. More specifically, the linguistic analytical data store component 44 may contain a plurality of event data that is used to generate and store linguistic marker data that, in one embodiment, corresponds to a multi-dimensional linguistic noise coordinate system extended to include a Smart Term Index as one of a multitude of dimensions. In another embodiment, a linguistic marker may be a three dimensional space including a PE_Factor, a PE_Leverage and a Smart Term Index as illustrated in FIG. 9.

As step 102 in FIG. 8, the classset of analytical data for a plurality of Linguistic Markers over a recent period of time is imported. As step 104, various computations are executed. Step 104 may include the computation of the Smart Term Index for a plurality of segments aggregated across each child classset (M,S) where M=set of matchtypes and S=set of segment scope and given a Reference Dictionary Dictionary 52 ('RefDict'):

$$EM\_SourceCount_S^M = \sum_{t=0}^{n} EM\_SourceWords_S^M \cap EM\_RefDict(SourceTerms)_S^M$$

$$FM\_SourceCount_S^M = \sum_{t=0}^{n} FM\_SourceWords_S^M \cap FM\_RefDict(SourceTerms)_S^M$$

$$MT\_SourceCount_S^M = \sum_{t=0}^{n} MT\_SourceWords_S^M \cap MT\_RefDict(SourceTerms)_S^M$$

and $$EM\_PrescribedCount_S^M = \Sigma_{t=0}^n EM\_TargetWords_S^M \cap EM\_RefDict(PrescribedTerms)_S^M$$

$$FM\_PrescribedCount_S^M = \Sigma_{t=0}^n FM\_TargetWords_S^M \cap FM\_RefDict(PrescribedTerms)_S^M$$

$$MT\_PrescribedCount_S^M = \Sigma_{t=0}^n MT\_TargetWords_S^M \cap MT\_RefDict(PrescribedTerms)_S^M$$

$$EM\_Coefficient_S^M = \frac{\sum_{i=0}^n EM\_SourceWords_S^M}{\sum_{i=0}^n EM\_Words_S^M}$$

$$FM\_Coefficient_S^M = \frac{\sum_{i=0}^n FM\_SourceWords_S^M}{\sum_{i=0}^n FM\_Words_S^M}$$

$$MT\_Coefficient_S^M = \frac{\sum_{i=0}^n EM\_SourceWords_S^M}{\sum_{i=0}^n MT\_Words_S^M}$$

gives for a given Reference Dictionary 'RefDict':

$$EM\_TermIndex_S^M = \frac{EM\_PrescribedCount_S^M \times EM\_Coefficient}{EM\_SourceCount_S^M}$$

$$FM\_TermIndex_S^M = \frac{FM\_PrescribedCount_S^M \times FM\_Coefficient}{FM\_SourceCount_S^M}$$

$$MT\_TermIndex_S^M = \frac{MT\_PrescribedCount_S^M \times MT\_Coefficient}{MT\_SourceCount_S^M}$$

where 'SourceWords' is the plurality of terms within a source segment, 'TargetWords' is the plurality of terms within a target segment, 'SourceTerms' is the plurality of terms within the Reference Domain Dictionary 52 (i.e., RefDict), PrescribedTerms' is the plurality of target translation terms associated with the respective set of SourceTerms, and 'Coefficient' is a number from 0.0 to 1.0 reflecting the percentage of source terms within the Reference Domain Dictionary 52.

It is further noted that if the Source Count is zero, then an NA (i.e., not any) value is assigned to the Smart Term Index. Moreover, when the Source Count and the Prescribed Count are close to each other, then it would reflect a value close to 1.0 without the Coefficient value.

Step 104 illustrated in FIG. 8 and performed by the STLA-SS 32, may include the computation of the Smart Term Index and the Smart Term Linguistic Vector per child classset.

Creation of the Match Dictionary 70 from the plurality of matches may include:

$$MatchDictionary = \cap \Sigma_{i=1}^m \Sigma_{w=0}^n MatchBilingualPair_w^m$$

where 'm' equals the number of matches, 'n' equals the number of target translation words per match, and 'MatchBiLingualPair' is a source and target term where the target term is a prescribed equivalent term within a match found within a domain or language dictionary. The plurality of MatchBiLingualPair source terms is the set of source terms for respective prescribed translations within the domain or language dictionary.

Creation of a Final Dictionary 72 using the plurality of final segments may include:

$$FinalDictionary = \cap \sum_{i=1}^m \sum_{w=0}^n FinalBiLingualPair_w^m$$

where 'm' is equal to the number of final segments, 'n' is equal to the number of target translation words per final segment, 'FinalBiLingualPair' is a source and target term where the target term is a prescribed equivalent term within a final translation segment found within a domain or language dictionary, and the plurality of 'Final BiLingualPair source terms' is the set of source terms for respective prescribed translations within the domain or language dictionary.

The OTI 76 for each child classset (M,S) associated with the original referenced domain dictionary is computed as follows:

$$EM\_OTI_S^M = \sum_{i=1}^m EM\_TermIndex_S^M / m$$

$$FM\_OTI_S^M = \sum_{i=1}^m FM\_TermIndex_S^M / m$$

$$MT\_OTI_S^M = \sum_{i=1}^m MT\_TermIndex_S^M / m$$

where 'M' is the set of match types, and 'S' is the set of segment scope (size: Small, Medium, Complex).

The BTI 80 is computed using the plurality of best matches 78 and the Final Dictionary 72 as the Reference Domain Dictionary 52. The FMTI 88 is computed using the plurality of final translation segments 74 and the Match Dictionary 70 as the Reference Domain Dictionary 52. The FTI 84 is computed using the plurality of final translation segments 74 and the original Reference Domain Dictionary 52.

As step 106 in FIG. 8, the Smart Term Linguistic Vector 49 (see FIG. 6) and the Smart Term Linguistic Noise are computed by the STLA-SS 32. The Smart Term Linguistic Vector 49 is calculated per child classset using one of the following formulas:

$$_TVector_S^M = (1 - _TTermIndex_S^M) X _TLinguisticVector_S^M$$

or $$_TVector_S^M = \sqrt{(1 - _TTermIndex_S^M)^2 + _TLinguisticVector_S^{M^2}}$$

Such that:

$$SmartTermLinguisticVector_S^N = \begin{bmatrix} _{EM}Vector_S^M \\ _{FM}Vector_S^M \\ _{MT}Vector_S^M \end{bmatrix}$$

where, in one embodiment, the child classset would be defined by 'T' equal to the Match Type [EM, FM, MT], 'S' equal to the Segment scope [Small, Medium, Complex], and 'M' equal to the Majorkey.

In the first embodiment of a Vector, the Term Index is a multiplier of the noise represented by a Linguistic Vector 90 (FIG. 6) composed of a PE_Factor and PE_Leverage. By including a Term Index metric 91 (FIG. 6) as a multiplier on the Linguistic Vector 90 the TSC 22 operational team is able to measure how much noise is caused by terminology misalignment such that (for example) if Term Index 91 is 1.0 (there is a prescribed equivalent for every source term) then zero noise was contributed from the terminology misalignment. This embodiment is useful for isolating terminology misalignment.

In the second embodiment, a Vector is a composite of a Term Index 91 and a Linguistic Vector 90 which is useful for visualizing how Term Index 91 works with other metrics across the TSC 22. If the Term Index 91 is 1.0, the Vector still reflects some noise value but zero is attributed to any terminology misalignment. When aggregating statistical models, the second embodiment helps to bring in a multi-dimensional perspective. Both Vector embodiments are valid as each defines a different space for visualizing linguistic noise attributed to terminology misalignment.

As step 108 in FIG. 8, a Smart Term Terminology predictive models is created by the STLA-SS 32 and stored in the linguistic analytical data store 44. The STLA-SS 32 performs statistical analysis to build one or more Smart Term Terminology predictive models. A Smart Term terminology predictive model stored in the linguistic analytical data store 44 is retrievable by the STE-SS 36.

Referring to FIG. 10, one embodiment of a Smart Term terminology predictive model defines a plurality of composite thresholds values for Term Index 91 against a range of MT:Metric scores 220. The ranges of MT:Metric scores (i.e., MT confidence score) would be associated with a Domain Dictionary that may be used to decide if the PE component 30 is needed or not. While the use of multi-dimension MT confidence scores is not novel, the integration of Smart Term Index with MT confidence scores within a linguistic noise coordinate system leveraged managed by a TSC operational analytical system is not known to be exist in existing art of the translation operations.

Referring to FIG. 10, a table illustrates the routing performed by a STE-SS 36 and generally represents a smart term terminology predictive model. The STLA-SS stores each Smart Term terminology predictive model into the linguistic analytical data store 44 for upstream and downstream component use (see step 110 in FIG. 8). Referring to the table, for a 'Full_PE', perform PE component 30 (i.e., review and correct) on all (100%) of the new source segments. For a 'Lite_PE', perform PE (i.e., review most and correct only major errors) on a subset of new content segments with low Smart Term Index values. For a 'Gist' service, perform a review PE, correct only a few new content source segments. For a PassThru', return the MT translations as-is with no PE.

Figure 11:
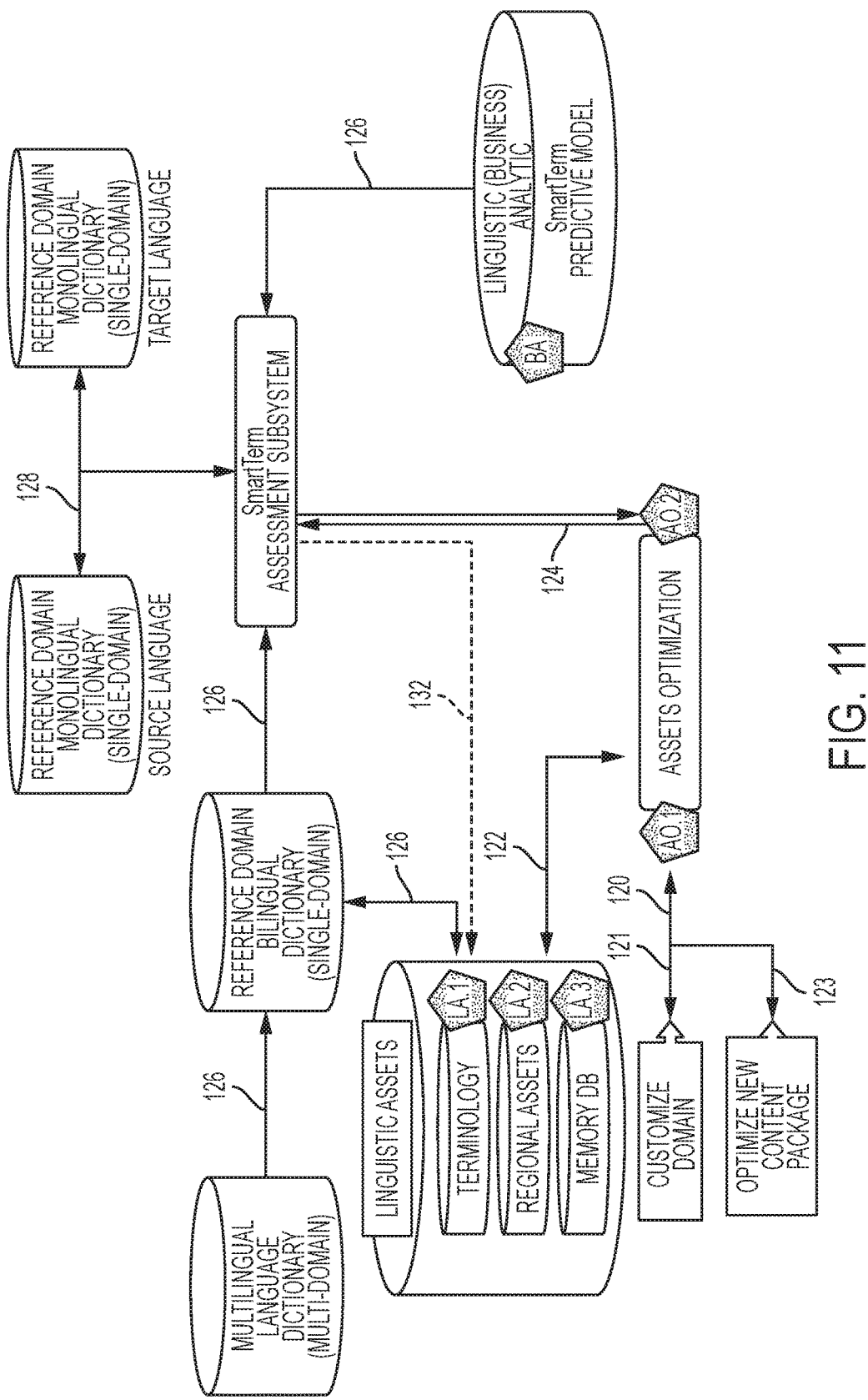
FIG. 11 depicts an exemplary method of operation of a smart term assessment subsystem of the smart terminology marker system.

Smart Term Assessment Subsystem:

Referring to FIG. 11, a smart term learning work flow is illustrated for both a Customize Domain service request and an Optimize New Content Package service request to the Asset Optimization 26 component. The STA-SS 34 of the STMS 24 is configured to produce a terminology enriched linguistic asset based on a plurality of historical translation memories and known source terms found in the source content package, and target language terms found in the target language matches.

Figure 12:
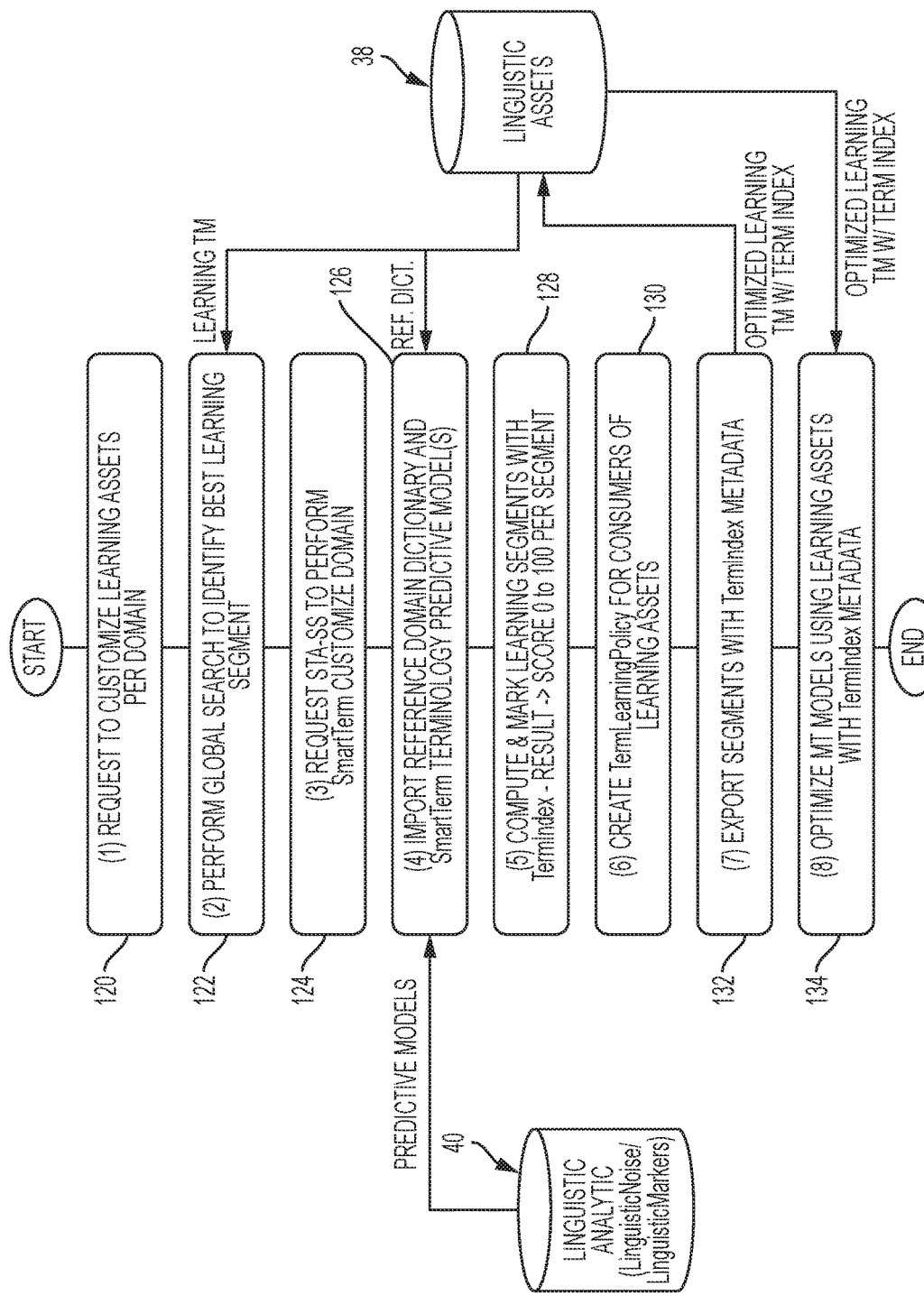
FIG. 12 is a flow chart illustrating the smart term assessment subsystem operation for the task 'Customize Domain'.

Referring to FIG. 12, the STA-SS 34 performs a series of tasks in response to a Customize Domain service request to (These tasks are also reflected in FIG. 11). Task 120 is the request submitted to the asset optimization component 26 (i.e., TM component 26) of the TSC 22. The asset optimization component 26 is requested to provide plurality of learning assets for customizing downstream MT models. A typical embodiment uses a plurality of bilingual translation memories and/or a plurality of bilingual dictionaries. Task 122 is the performance of a global search to identify best segments for learning for a given domain $D_x$. The asset optimization component 26 will request the linguistic asset component 38 to perform a global search and provide a set of learning assets. The set of learning assets is returned to the asset optimization component 26.

Task 124, the asset optimization component 26, sends a Customize Domain request to the STA-SS 34 to customize the learning assets for a given reference domain dictionary. Task 126 is an import of the Reference Domain Dictionary and the Smart Term terminology predictive model. The STA-SS 34 imports the Reference Domain Dictionary containing a plurality of bilingual terms using the linguist asset component 38. The STA-SS 34 uses the linguistic analytics component 40 to import the Smart Term terminology predictive model. Task 128 computes the Smart Term Index 91 for each segment and uses the Smart Term terminology predictive model to insert a Smart Term marker(s) containing a Smart Term Index and other terminology metadata within each target translation within each segment such that downstream components could use the embedded Smart Term marker to evaluate a plurality of learning segments.

In one embodiment, the STA-SS 34 may create a Reference Domain Monolingual Dictionary for the source language (using the plurality of the source terms within the learning assets) and for a target language (using the plurality of the source terms within the learning assets). More specifically, a task 130 may create a Term Learning Policy for consumers of learning assets. The STA-SS 34 uses the Smart Term terminology predictive model to define the Term Learning Policy that identifies the best segments based on Term Index per segment.

In one embodiment, the Smart Term terminology predictive model may establish a threshold for Term Index per segment for a given Reference Domain Dictionary such that a Term Index which is greater than the RefDict_Threshold would be selected. In a specific embodiment, the STA-SS 34 would utilize the RefDict_Threshold to remove a plurality of segments that fall below the threshold.

In a second embodiment, the STA-SS 34 may use the Smart Term terminology predictive model to establish multi-tier ranges that would divide the plurality of learning segments into Low, Medium and High learning predictive ranges such that MT customization would do a three-tier learning operation. The STA-SS 34 may store the multi-tier ranges as a Term Learning Policy reference for downstream components.

A task 132 may include the export of segments having Term Index metadata. The STA-SS 34 may store the optimized learning assets into the linguistic analytical data store 44 via the Linguistic Analytical data services 39 for downstream consumption using a unique identifier, and return the unique identifier to the asset optimization component 26.

As task 134, the MT component 28 optimizes the learning assets using the Term Index metadata. The MT component 28 imports the learning assets along with the Term Index per segment and any Smart Term metadata to optimize the MT domain model and store.

Figure 13:
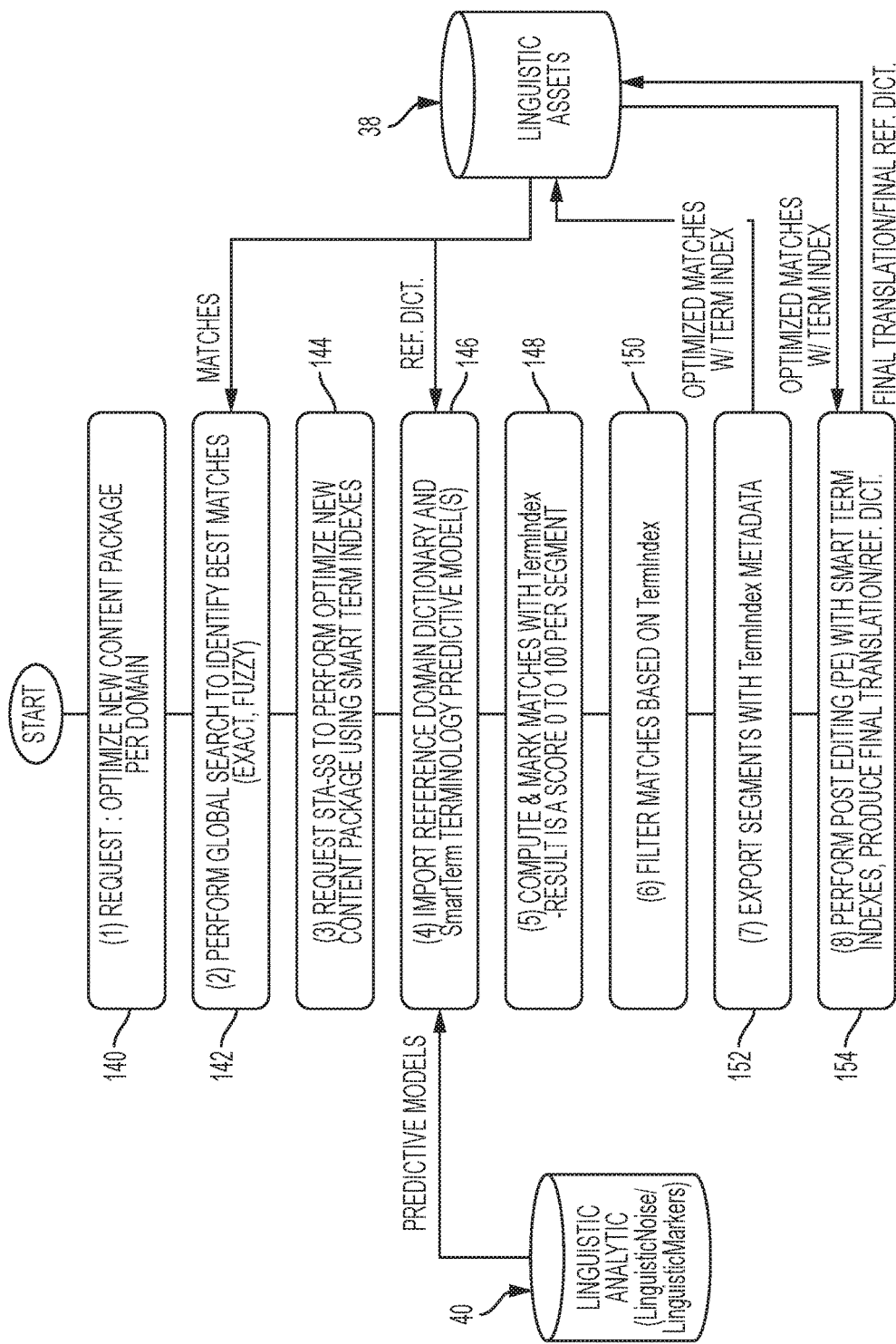
FIG. 13 is a flow chart illustrating the smart term assessment subsystem operation for the request 'Optimize New Content Package'.

Referring to FIG. 13, tasks performed by the STA-SS 34 in response to a request to Optimize New Content Package is illustrated. The service request for Optimize New Content Package begins with task 140 wherein the asset optimization component 26 is requested to optimize a new content package containing a plurality of source segments typically before translation either by MT component 28 and/or post editing component 30. In task 142 the asset optimization component 26 will request the linguistic asset component 38 to perform a global search and provide a set of matches for downstream translation. The set of matches is returned to the asset optimization component 26. In task 144 the asset optimization component 26 sends a request to the STA-SS 34 to optimize the new content package with the best potential matches for a given reference domain dictionary. In Task 146 the STA-SS 34 imports the Reference Domain Dictionary containing a plurality of bilingual terms using the linguist asset component 38. And, the STA-SS 34 uses the linguistic analytic component 40 to import the Smart Term terminology predictive model. In Task 148 the STA-SS 34 computes the Smart Term Index 91 for each match against the Reference Domain Dictionary 52 and embeds the Smart Term Index 91 and other Smart Term metadata as a Term Index marker within each match such that a downstream component may use the respective Term Index markers to evaluate a plurality of matches.

In one embodiment, the STA-SS 34 may create a Reference Domain Monolingual Dictionary for the source language (using the plurality of the source terms within the learning assets) and for a target language (using the plurality of the source terms within the learning assets). As task 150, matches may be filtered based on the Term Index. The STA-SS 34 uses the Smart Term terminology predictive model to filter out matches predicted to not be efficient during downstream translation.

In one embodiment, the Smart Term terminology predictive model could establish a threshold for the Term Index per match for a given reference domain dictionary such that if the match Term Index is less than the RefDict_threshold, it would be removed from the list of matches.

In a second embodiment, the STA-SS 34 may use the Smart Term terminology predictive model to convert the Term Index per match into a Term Confidence Score that may be embedded within the match. A downstream computer aided translation editor (CAD) may use the Term Confidence Score to assist a human professional linguist in the evaluation of the match. A task 152 may include the exportation of segments with Term Index metadata. The STA-SS 34 stores the matches into the linguistic analytic component 40 for downstream consumption using a unique domain reference identifier, and returns the unique identifier to the asset optimization component 26. A final task 154 is optimization of the translation by the MT and/or PE components 28, 30 using the Term Index metadata. The MT component 28 imports the learning assets along with the Term Index per segment and any Smart Term metadata to optimize the MT domain model and store.

Figure 14:
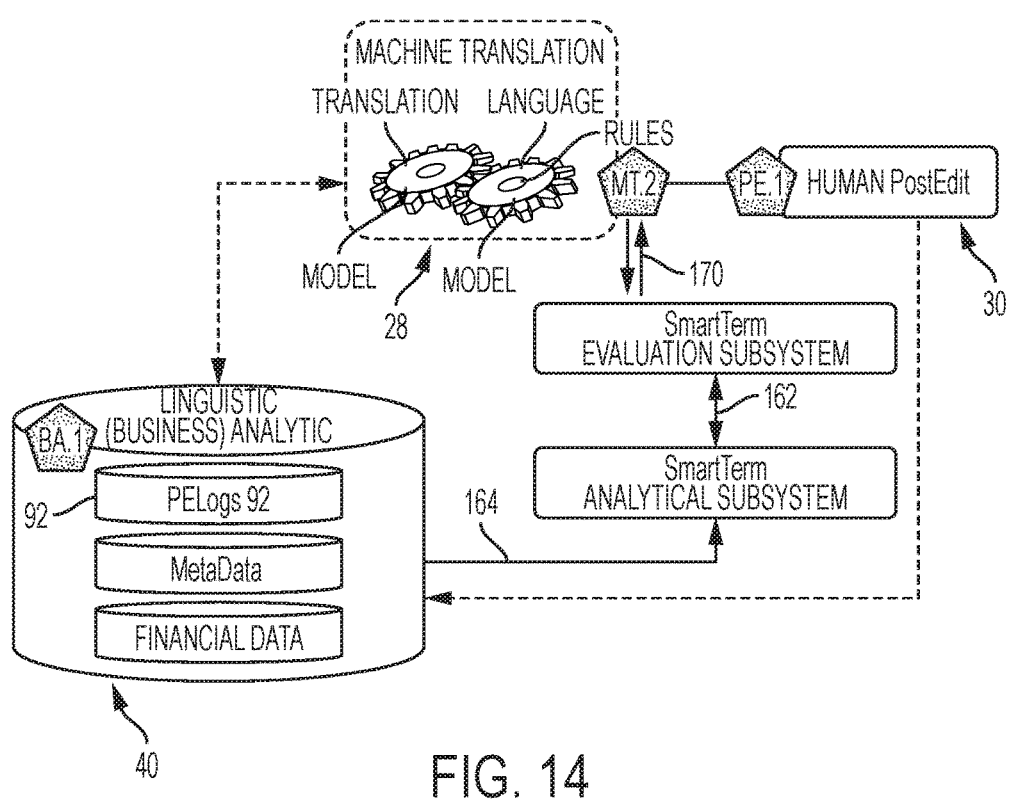
FIG. 14 depicts an exemplary method of operation of a smart term analytical subsystem interfacing with a smart term evaluation subsystem (STE-SS)

Smart Term Evaluation Subsystem:

Referring to FIG. 14, a Smart Term evaluation flow example is illustrated. The STE-SS 36 of the STMS 24 is configured to evaluate the matches produced by any component within the TSC 22 to enable smarter post editing and improve the efficiency of the MT component 28. The MT component 28 may be used as the component producing MT matches. The STE-SS 36 performs analysis and evaluation of the MT match after the MT component 28 generates MT matches.

Figure 15:
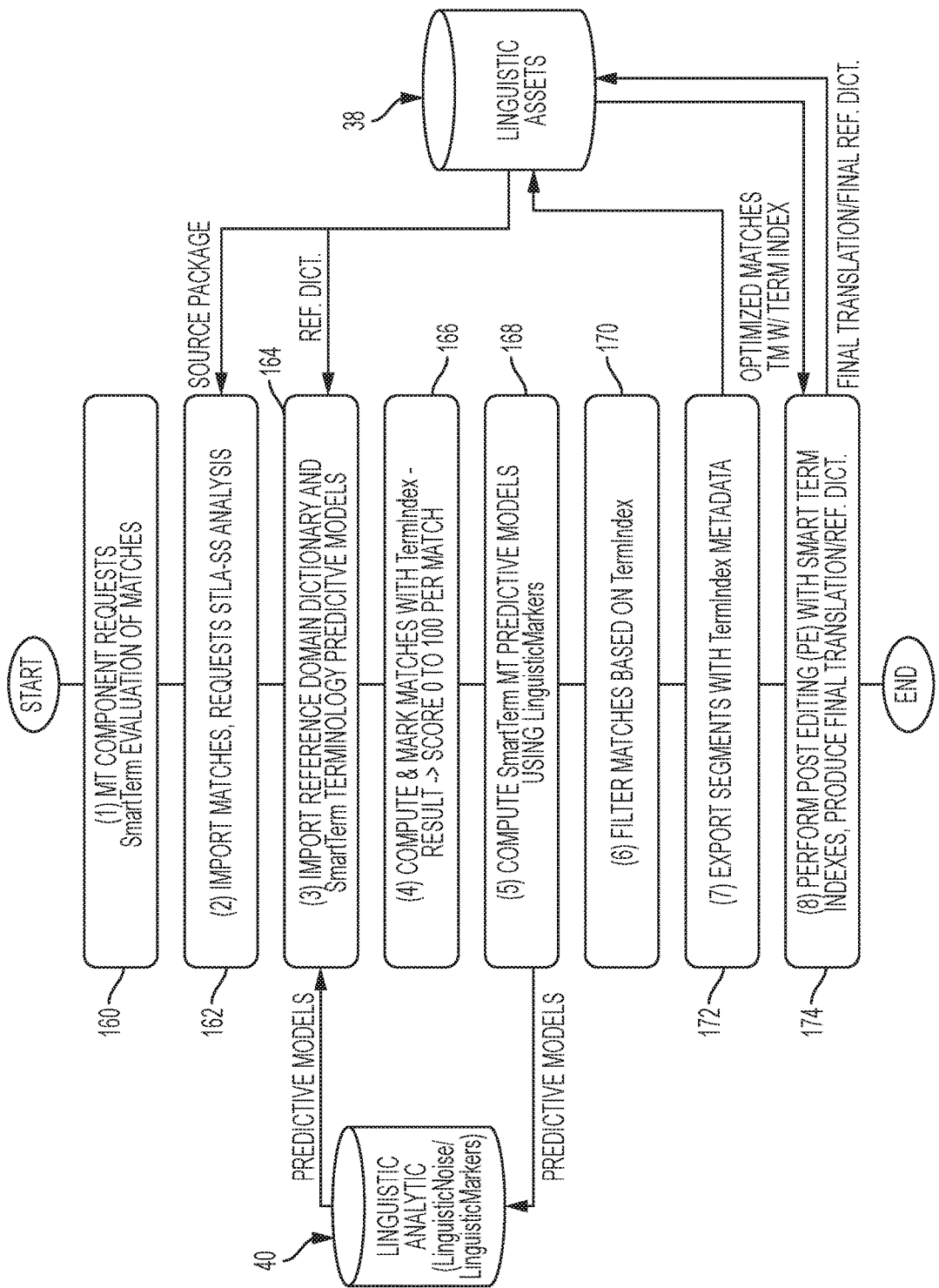
FIG. 15 is a flow chart illustrating an evaluation of MT matches by the smart term evaluation subsystem.

Referring to FIGS. 14 and 15, the STE-SS 36 performs a variety of tasks to evaluate MT component 28 matches prior to human post editing via the PE component 30. A first task 160 is a request from a component of the TSC 22, that may typically be the MT component 28, but may be requested from the PE component 30, to conduct a Smart Term evaluation of a plurality of matches. In one embodiment, the MT component 28 requests the STE-SS 36 to perform a Smart Term evaluation of a package containing a plurality of MT matches against a domain unique identifier. This may be done before the post editing translation. A task 162 may be the import of the MT matches and a request for a STLA-SS 32 analysis. The STE-SS 36 imports the matches from the source package and requests the STLA-SS 32 to evaluate the MT matches using a domain unique identifier.

For each segment to be translated there may be one (1) to 'N' matches (e.g. Exact, Fuzzy, Machine or others). Moreover, other linguistic markers may be embedded within the source package that may be recognized by the STLA-SS 32. Examples of other linguistic markers may include any combination of the following:

a. In one embodiment, the MT matches may contain an MT:Metric score 220 linguistic marker providing a confidence score of the MT match as defined by the MT component 28.

b. In one embodiment, each MT match may include a Smart Term Index based on the terminology Term Index from the STA-SS 152.

A following task 164 may include the import of the Reference Domain Dictionary and Smart Term terminology predictive model(s). The STLA-SS 32 imports the Reference Domain Dictionary containing a plurality of bilingual terms using the linguist assets component 38. The STA-SS 34 uses the linguistic (business) analytic component 40 to import the Smart Term terminology predictive model.

The next task 166 is a computation of the Term Index of the match dictionaries. In one embodiment the STLA-SS 32 first creates an MT Match Dictionary 701 using the plurality of MT matches obtained from the source package and creates an EM Match Dictionary 703 using the plurality of exact matches.

Figure 16:
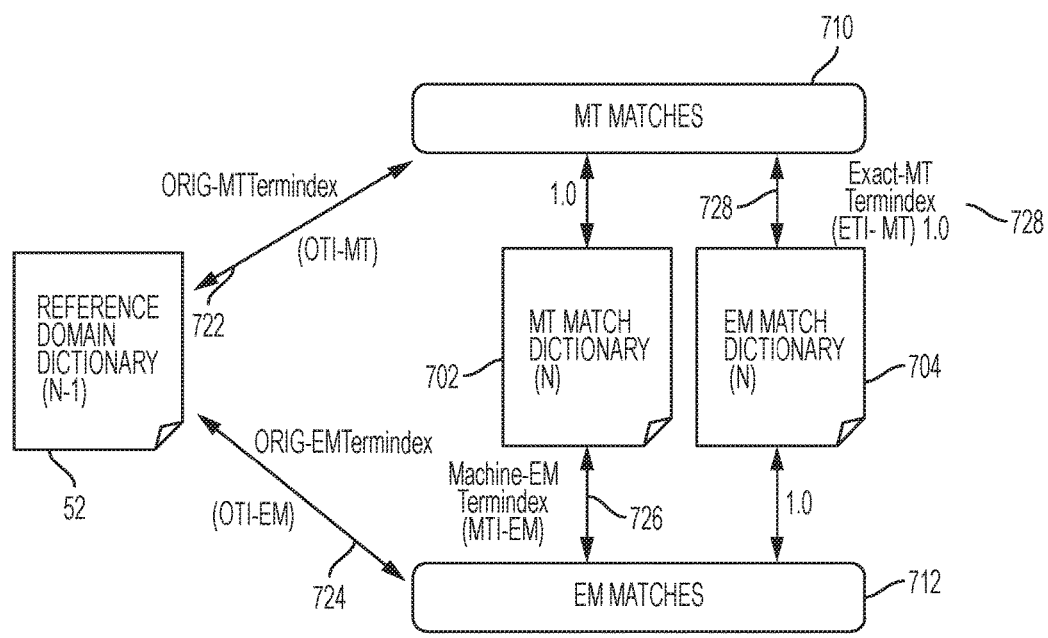
FIG. 16 depicts an example of a Post MT marker applied by the language translation system.

Referring to FIG. 16, in one embodiment, the STLA-SS 32 may compute the following:

The OTI-MT 722 (OTI 76) for all MT matches 710 against the Reference Domain Dictionary 52.

The OTI-EM 724 for all EM matches 712 against the Reference Domain Dictionary 52.

The ETI-MT 728 for all MT matches 710 against the Exact Match Dictionary 704.

The MTI-EM 726 for EM matches 712 using the exact matches against the MT Match Dictionary.

A Smart Term Index 78 per MT match 710 using the MT matches 710 against the Reference Domain Dictionary 52.

Referring to FIG. 16, an example of post MT markers is illustrated. A task 168 (see FIG. 15) entails the computation of Smart Term MT predictive models using linguistic markers (722, 724, 726, 728). The STLA-SS 32 use the set of Term Index points (OTI-MT 722, OTI-EM 724, ETI-MT 728, MTI-EM 726), the MTI-base (metrics), the plurality of Smart Term Index per MT match, and the Smart Term terminology predictive model associated with the domain unique identifier to compute a Smart Term MT predictive model.

In one embodiment, the STLA-SS 32 analyzes the Term Index of each match in relationship to MT:Metric score (see element 220 in FIG. 10) linguistic markers per match to assess patterns and build a Smart Term MT predictive model where the MT match is an outlier in terms of terminology alignment.

Figure 17:
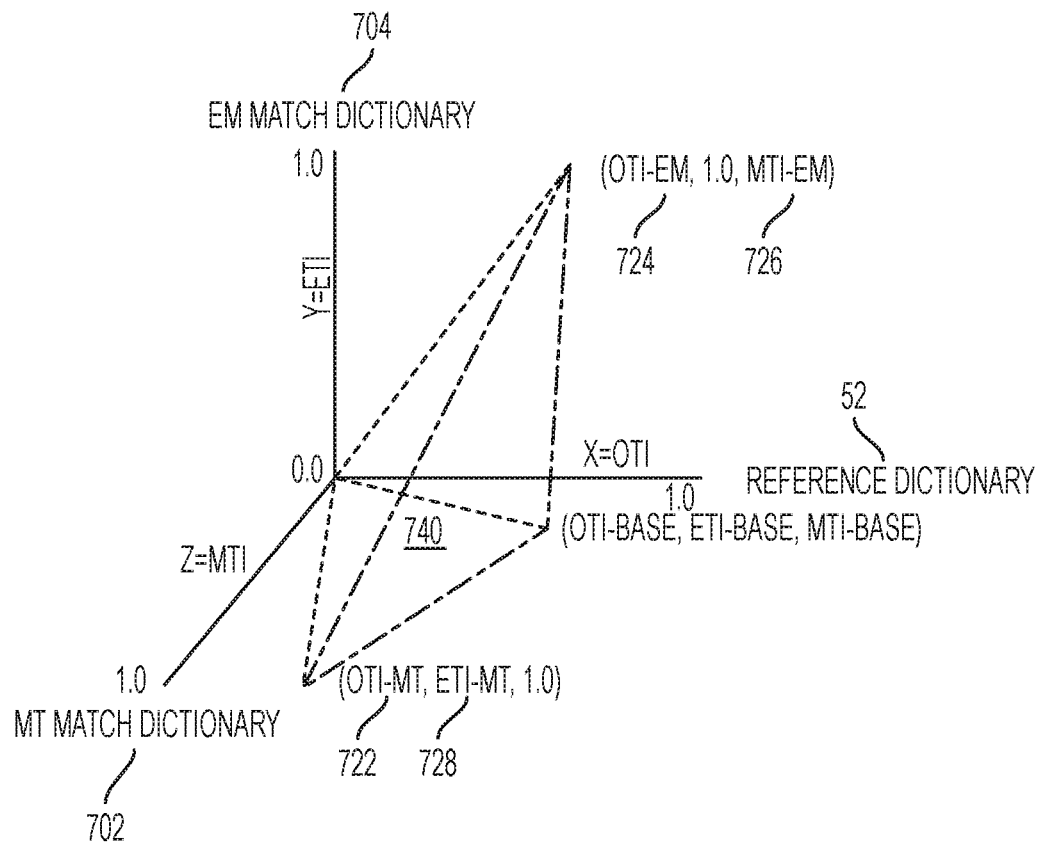
FIG. 17 is an exemplary graph illustrating a smart term area applied by the STLA-SS.

In another embodiment, the STLA-SS 32 computes a Smart Term Area (see FIG. 17) based on a three dimensional coordinate system using the OTI against the Reference Domain Dictionary as the x axis. The size of the area may reflect the amount of noise within the TSC 22. Using the baselines Smart Term Index, the ETI against the EM Match Dictionary 703, and the MTI against the MT Match Dictionary as constants, (i.e., 1.0), the STLA-SS may determine how the Smart Term Area is affected by the EM and MT Smart Term Index/dictionary. The STLA-SS 32 computes, for each shipment, the following coordinates:
 a. x=OTI–EM, y=ETI–EM, z=MTI–EM, fixed point based on EM match
 b. x=OTI–base, y=ETI–base, z=MTI–base, fixed point on the STLA-SS's baseline (average of all sampled historical matches).
 c. x=OTI–MT, y=ETI–MT, z=1.0, fixed point based on MT match where OTI–EM 724 and OTI–MT 722 may reflect the Term Index of the EM match and MT match, respectively, using the Reference Domain Dictionary 52, where ETI–MT 728 is the Smart Term Index of the MT matches using the MT match respectively against the Exact match dictionary 704, and where MTI–EM 726 is the Smart Term Index of the EM matches against the MT match directory 702.

The STLA-SS 32 then invokes analytical streams to build one or more Smart Term MT predictive models by analyzing the plurality of MT matches and assessing which MT matches and respective Term Index will need terminology correction in downstream post editing component. The area of the Smart Term Area triangle (see FIG. 17) is computed and assigned as one metric (i.e., dimension) with a multi-dimensional linguistic marker value for each MT match.

Task 170 (see FIGS. 14 and 15) includes filtration of matches based on the Term Index.

The STA-SS 34 uses the Smart Term MT predictive models to filter out matches predicted to not be efficient during downstream translation. In one embodiment, the Smart Term MT predictive model establishes a threshold for the Term Index per match for a given reference domain dictionary such that if Term Index of the MT match is less than the RefDict_Threshold, it would be removed from the list of matches. In a second embodiment, the STA-SS 34 uses the Smart Term Area value as a linguistic marker to be embedded within the MT match. A downstream CAT editor (i.e., PE component 30) may use the Smart Term Area linguistic marker to assist a human professional linguist on the evaluation of the match.

A following task 172 entails the export of segments having Term Index metadata. The STA-SS 34 returns the updated MT matches to the STE-SS 36. The STE-SS 36 stores the new MT matches and linguistic markers into the source package for use and consumption by a downstream component, and returns the unique identifier to the asset optimization component 26.

A task 174 performs post editing (PE) on each new content segment assisted by the embedded Smart Term Indexes Features and benefits of the present disclosure include the STMS 24 and related methods that provide a Smart Term Index as a foundation for measuring noise from terminology misalignment and when linguistic assets are not aligned with a Referenced Domain Dictionary. As demonstrated, the higher the Smart Term Index the more aligned a linguistic asset is with a Referenced Domain Dictionary, driving higher quality and consistency within a Translation Supply Chain 22. Other features include measuring the Smart Term Index 78 associated with the MT matches and/or EM matches relative to a Reference Domain Dictionary 52, a MT Match Dictionary, and/or a EM Match.

Further features and benefits include an STLA-SS 32 that provides system and methods for measuring Smart Term Linguistic Vectors to reflect the terminology noise within the multi-dimensional measurement system of Linguistic Noise within a Translation Supply Chain 22, building statistical models that enable evaluation of MT matches containing Term Indexes, providing system and methods to predict the smallest Final Term Index for a given final translation given a plurality of OTI 76 for a given classset, measuring the amount of Linguistic Noise attributes from a plurality of Smart Term Index markers passed from downstream linguistic components, assessing and weighting the importance of terms for a given Reference Domain Dictionary across a plurality of shipments within a Translation Supply Chain 22, creating Smart Term models and identifying patterns for a Smart Term Index for a plurality of Reference Domain Dictionaries, and enabling predictive analytics to alert when linguistic assets (memories/TermDB) are no longer aligned with a Final Dictionary (terminology changes) relative to a Reference Domain Dictionary indicating when action is needed to harmonize the two.

Other benefits include: human professional linguists efficiency improvements by providing a stable and reliable terminology measurement and evaluation system that is correlated to the labor spent correcting linguistic assets per domain, an STA-SS 34 that produces a plurality of Smart Term Linguistic Markers that enable MT services to maximize the quality of MT output using downstream terminology analytics, an STE-SS 36 that evaluates and analyzes matches from downstream components (e.g. MT) to predict which matches should be filtered, and that evaluates and analyzes matches from downstream components (e.g. MT) to assist human professional linguist with managing terms during the post editing session.

The present disclosure may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for developing linguistic markers computed for a given plurality of matches associated with respective reference dictionaries and respective final dictionaries, the method comprising:

generating an Original Term Index (OTI) by a smart term assessment subsystem (STA-SS) using a plurality of best matches across a plurality of source and target language segments and the respective reference dictionaries;

generating a Best Term Index (BTI) by a smart term linguistic analytical subsystem (STLA-SS) using the plurality of best matches across the plurality of source and target language segments and the respective final dictionaries;

generating a Perfect Term Index (PTI) by the STLA-SS using a plurality of final translations across the plurality of source and target language segments and the respective final dictionaries;

generating a Final Term Index (FTI) by the STLA-SS using the plurality of final translations across the plurality of source and target language segments and using the respective reference dictionaries;

generating a Match Term Index (MTI) by the STLA-SS using the plurality of best matches across the plurality of source and target language segments and using respective match dictionaries; and generating a Final Match Term Index (FMTI) by the STLA-SS using the plurality of final translations across the plurality of source and target language segments and using the respective match dictionaries.

2. The method set forth in claim 1, wherein the match dictionaries is a plurality of unique words found in the plurality of matches, and the final dictionary is a plurality of unique words found in the plurality of final translations.

3. The method set forth in claim 1, wherein the OTI, the BTI, the PTI, the FTI, the MTI and the FMTI are each computed at least in-part by removing duplicate words in the source and target language segments.

4. The method set forth in claim 3, wherein the OTI, the BTI, the PTI, the FTI, the MTI and the FMTI are each computed at least in-part by counting a number of source terms found within a source match segment.

5. The method set forth in claim 4, wherein the OTI, the BTI, the PTI, the FTI, the MTI and the FMTI are each computed at least in-part by counting a number of prescribed target terms found with a target match segment.

6. The method set forth in claim 5, wherein the OTI, the BTI, the PTI, the FTI, the MTI and the FMTI are each computed at least in-part by applying equation;

$$TermIndex^m = \frac{\sum_{i=1}^{n} TargetWord^i \cap PrescribedTargetTerms_1^n}{\sum_{i=1}^{n} SourceWord^i \cap RefDictSourceTerms_1^n} \times MatchCoefficient.$$

7. The method set forth in claim 1 further comprising: deriving a smart term linguistic vector.

8. The method set forth in claim 7, wherein the smart term linguistic vector is derived from a plurality of Smart Term Index markers.

9. The method set forth in claim 8, wherein the smart term linguistic vector is a set of numerical values representing the distance from a linguistic marker match coordinate to a perfect match coordinate.

10. A computer implemented method for translating a language comprising:
   parsing source language content into one or more source language segments;
   parsing target language content into one or more target language segments;
   searching a repository to identify domain specific linguistic assets of the language;
   creating a translation model using the domain specific linguistic assets of the language;
   providing machine generated suggested matches of the one or more source language segments and the one or more target language segments based upon the translation model;
   using a computer-aided translation editor to review the suggested matches to produce a final translation; and
   applying smart terminology markers generated by a smart terminology marker system to reduce linguistic noise in the final translation, wherein the smart terminology markers comprise a first marker indicative of a portion of the linguistic noise attributable to terminology misalignment.

11. The method set forth in claim 10, wherein the suggested matches include at least one of fuzzy matches, exact matches and machine matches.

12. The method set forth in claim 11, wherein the first marker is a Smart Term Index associated with a particular source language segment and a corresponding target language segment.

13. The method set forth in claim 12, wherein the Smart Term Index is determined by removing duplicate words in the particular source language segment and the corresponding target language segment, by counting a number of source terms found within a source match segment, by counting a number of prescribed target terms found with a target match segment, and by applying equation;

$$TermIndex^m = \frac{\sum_{i=1}^{n} TargetWord^i \cap PrescribedTargetTerms_1^n}{\sum_{i=1}^{n} SourceWord^i \cap RefDictSourceTerms_1^n} \times MatchCoefficient.$$

14. The method set forth in claim 13, wherein the Smart Term Index includes an OTI, a BTI, a PTI, a FTI, a MTI and a FMTI.

15. The method set forth in claim 14, wherein each of the OTI, the BTI, the PTI, the FTI, the MTI and the FMTI includes a fuzzy match, an exact match and a machine match.

* * * * *